United States Patent [19]

Labrador

[11] Patent Number: 5,094,595

[45] Date of Patent: Mar. 10, 1992

[54] LABRADOR WATER-WAVE ENERGY CONVERTER

[76] Inventor: Gaudencio A. Labrador, 1312 Leaf Ter., San Diego, Calif. 92114

[21] Appl. No.: 376,002

[22] Filed: Aug. 15, 1989

Related U.S. Application Data

[63] Continuation-in-part of Ser. No. 820,082, Jan. 21, 1986, which is a continuation-in-part of Ser. No. 631,322, Jul. 19, 1984, abandoned.

[51] Int. Cl.$^5$ .............................................. F04B 35/00
[52] U.S. Cl. ...................................... 417/332; 60/506
[58] Field of Search .............. 417/330, 332, 268, 259, 417/264, 266; 60/506; 290/53

[56] References Cited

U.S. PATENT DOCUMENTS

| | | | |
|---|---|---|---|
| 411,252 | 9/1889 | Metzger | 417/259 |
| 1,061,091 | 5/1913 | Lewis | 417/330 |
| 1,887,316 | 11/1932 | Lockfaw | 417/330 |
| 2,028,331 | 1/1936 | Jänicke | 417/268 |
| 2,423,720 | 7/1947 | Müllejans et al. | 417/268 |
| 3,190,545 | 6/1965 | Weber et al. | 417/268 |
| 3,809,507 | 5/1974 | Baglai | 417/259 |
| 4,087,209 | 5/1978 | Ma'hig et al. | 417/268 |
| 4,111,609 | 9/1978 | Braun | 417/267 |
| 4,115,034 | 9/1978 | Smith | 417/534 |
| 4,160,624 | 7/1979 | Smith | 417/330 |
| 4,358,254 | 11/1982 | Hannibal | 417/419 |
| 4,544,331 | 10/1985 | Shibuya | 417/269 |

Primary Examiner—Leonard E. Smith

[57] ABSTRACT

What has been invented is a machine that is planted on the ocean floor or set out floating on the ocean to convert the energy of the surfs into storable and consumable energies, such as, compressed air, etc., comprising:

a multistage axial-flow piston compressor that can be constructed in a straight line series of five or more of highly effective compression stages, having a plurality of adjoining chambers with common end walls, with piston in each chamber driven by a common piston rod, at least One one-way valve installed on each end wall and on each piston;

a power transfer mechanism that is erected either on the ocean floor or on a floating foundation set out on the ocean, which carry and drive said compressors, which is in the form of either an impact wall, or a couple of floating air tanks that make a see-saw oscillation, or a long series of air tanks interconnected by horizontal drive bars that press the chambers against the vertically oscillating pistons carried by said tanks, or an inverted capsule into which the surfs enter traping the air.

12 Claims, 9 Drawing Sheets

LABRADOR WATER-WAVE ENERGY CONVERTER

CROSS-REFERENCES TO RELATED APPLICATION

This application is a continuation-in-part of previous application Ser. No. 06/820,082 filed Jan. 21, 1986, now pending with a Notice of Allowability. Ser. No. 06/820,082 is a continuation-in-part of Ser. No. 06/631,322 dated Jul. 19, 1984, now abandoned.

Applicant's right to these subject inventions is full and complete as there is no Federal sponsorship on it.

BACKGROUND OF THE INVENTION

1. Field of the Invention:

Being a major factor in maintaining or improving the economy of every country of the world, energy, most particularly the oil form, has been imposing more and more critical problems to all nations, it being a disappearing material aside from being a polutant and not available to all nations. Nuclear energy, aside from being costly and unsafe, is not also available to all nations. To ease these problems, efforts had been more exerted than ever to explore and make use of the alternative and regenerative energies that do not use the fuel oil, such as, the wind, the solar, the ocean energy, and the municipal wastes.

In this invention, particular attention is concentrated on the maximum harnessing of the ocean waves in the maximum efficiency and effectiveness of energy convertion out of whatever size or amplitude of available water-wave that arrives at the structure to actuate the energy converter system. It is also the objective of this invention to maximize production of consumable energy (compressed air, electricity, or hydrogen gas) out of the water-waves at any weather condition, and at any location of the body of water or any part of the ocean, in the most simple and safest way, and in the least cost of construction and least cost of maintenance with high durability.

2. Description of Prior Art:

A. Referring to U.S. Pat. No. 4,160,624, dated July 10, 1979, "Water Vehicle-Actuated Air Compressor and Systems Therefor" by Smith, the paddles, which are submerged at the bottom of the barge, are actuated by the tilting and oscillation movements of the barge and not by the direct impact of the waves. This kind of design of an energy converter works only with the modulated water waves, so it must be placed away from rough seas and away from the beaches where the surfs stand up and break, otherwise, the whole system will be destroyed, or build the system into a very heavy out of proportion structure. This air compressor by Smith can work to some extent but without much expectation of its performance because there are glaring drawbacks and limitations, such as, the following:

a. The floating barge in open sea will be tossed up and down causing wear and tear, and reducing the durability and efficiency of all the parts. Actually it will require a very heavy structure of construction to withstand the stresses imparted by the big surf specially during violent weather. The anchor chain must be strong enough to hold the barge against the heavy impact of the surf on the wide side of the barge. In the same manner, the structures holding the anchor chain must be strong enough to keep holding the chain, otherwise, the whole barge will be torn apart into pieces. It therefor requires a very high cost of construction to withstand the forces of the waves during violent weather. This will result to a very low ratio of energy production against cost of construction and maintenance.

b. As per construction of the barge and the relative quantities and sizes of the paddles together with the steel compressed air tank and other machineries loaded on the barge, most of the energy brought in by the incoming water-wave will be spent splashing on the side of the barge and in tossing-up the heavy structure barge. Therefor, only a very small percentage of the energy offered by the waves is use to actuate the paddles.

c. The presented design of the paddles (parts #202 and 240), the compression cylinders (218), and the piston (220), as shown in the drawings, no matter how they will be modified, as a water-wave actuated compressor is limited to a certain size or amplitude of the waves because, if the amplitudes of the waves are relatively shorter than the length of the compression cylinder the piston does not reach the dead end of the compression cylinder resulting to a situation where the entrapped air will not be compressed far enough so it will refuse to enter the storage tank which is supposed to be in high pressure to contain plenty of energy reserved therein; and if the size or amplitude of the waves are relatively longer than the length of the compression cylinder the piston will hit the dead end of the cylinder and stops there too early. The remaining part of the long wave amplitude will be spent or destroyed needlessly pushing the already locked or dead paddles, pressing it against the limiting walls of the barge, and tends to destroy the bearings and the connectors or the whole system. These special features of the patented design of the actuator-compression system limits the conversion of energy to a small quantity or a small percentage of the aboundant energy offered by the ocean waves.

d. During calm weather when the ocean waves are small, the heavy barge which is designed to withstand the big surfs will just be flattening the waves resulting to a zero efficiency, no production because there will be no oscillation.

e. There is no plurality of storage tank to meet the opportunity to store more energy.

B. Referring to U.S. Pat. No. 1,887,316 dated Nov. 8, 1932 presented by J. A. LOCKFAW, the compressor System consisting of the Paddle, the Piston Rod, the Piston, the Compression Cylinder are constructed in the same manner as that presented by Smith. It can also work but with the following drawbacks and problems encountered:

a. This invention has the same problem encountered as problem No. 3 cited for Smith's which concerns the amplitude of the water-wave, which I hereby submit as objectionable feature and limitations of the design in its effectivity and efficiency of converting the available energy of the surfs. Plenty of wave energy will be wasted due to this problem.

b. There is much problem of inconvenience in adjusting the compressor or the system to synchronize with sizes of the incoming waves as the gearing-in or the gearing-out of the stand-by compression chambers has to be done manually which requires a full time operator.

c. This design requires a full time operator to operate the car in adjusting the location of the power-board to synchronize with the elevation of the tides. This is also a problem of inconvenience.

d. A problem of durability is also an impediment to using this design because it will rust in salt water and easily destroyed by the waves during violent weather.

C. Referring to U.S. Pat. No. 1,061,091 dated May 6, 1913 by J. C. LEWIS, this design works good as a water pump provided there is no violent weather. But to make it work as an air compressor, the pump being simple, the problem of varrying amplitude or wave sizes will again present the impedement for commercial use of this invention.

D. Referring to U.S. Pat. No. 2,028,331 dated Jan. 21, 1936 by Hermann Janicke—a free piston three stage compressor, the following problems are present and impeds the commercial use of this design:

a. It requires fuel oil to make it work;

b. If it will be modified with a system so that the piston be actuated by the water waves, the problem on the varrying amplitude of the waves will again be unsolved. That means, as cited problem No. C on Smith's compressor, the pump is limited to a particular size or amplitude of waves in relation with the length of compression chamber, it being a simple pump even if constructed into a multi-stage compressor. If the piston moves halfway or ¾ of the length of the cylinder due to seasonal small waves available, the entrapped air partially compressed refuses to enter the storage tank and it will just kick the piston backward without storing energy because—(a) there are no valves in the pistons, (b) there are no valves at the rear end walls of the last compression cylinder, (c) the hollow piston, 2nd stage, is a hide out of partially compressed air that cannot be stored which will just kick the piston backward even if the piston has moved to the full length of the compression chamber. Thus, this pump presented by Janicke is a very poor performer when it is used to convert the energy of the water waves resulting to a very low ratio of production against cost.

E. Referring to U.S. Pat. No. 1,219,873 dated Aug. 7, 1924 by Maximilian F. Juruick of the United States of America, a two (2) stage piston compressor wherein the smaller piston has to occupy the whole length and width of the second chamber because there is no partition wall between the first and the second chamber—a condition that makes the piston into a very heavy block of metal that consumes a lot of energy just to move it back and forth, specially when built to have large diameter for the purpose of moving large quantities of air. This is the major error obstructing the economic use of said compressor. The second error of this compressor is—that the compressed air in chamber #27 is being allowed to expand again, passing thru valve #31 to occupy a larger chamber #15—which is a set back in the compression effort and a lose of a lot of energy. The third error of this design is—that the succeeding smaller chambers cannot be extended to have three or more compression stages because it will only be a stepped one-stage compression chamber having a stepped piston. This design is limited to only two (2) stages of compression. Incorporating valves in the pistons does not increase the number of stages to three or more. Further, the piston can not be made thin and light when this pump is built to be large diameter (10 to 20 feet) for used as vacuum pump driven by the large water waves. Further, unlike the multistage compressor pump subject of the present case, this pump by Juruick is not an axial-flow pump which requires a construction of a heavy metal block around the compression chambers to accommodate the passage ways of high pressure gases.

F. Referring to U.S. Pat. No. 3,190,545 dated June 22, 1965 by H. Weber of the United States of America, this is likewise a compressor limited to three (3) stages of compression due to, as pointed out in the above design by Juruick, the objectives of the design which is to make the pistons occupy the whole length and width of the chambers—a condition that creates a heavy block of metal if the diameter of the chamber is enlarged, and it is not feasible to add a 4th or 5th stage high pressure chamber because there is a piston rod passing thru the end walls on the left section of the pump that require very tight sealer packaging that creates friction resisting the movements of the piston rod. Further, unlike the pump subject of the present case, this pump by Mr. Weber has no partition walls between chambers and there are no valves incorporated in the pistons, hence, it is not an axial-flow piston pump, and hence, it cannot work with the varying amplitudes of the water waves.

G. Referring to U.S. Pat. No. 411,252 dated Sept. 17, 1889 by Gustav Metzger of Newark, N.J., U.S.A., a two (2) stage compressor wherein the 3rd stroke which is the upward movement of the plunger cylinder C, is already a discharge stroke moving the gas into cylinder D which is actually a storage tank it being a much larger space than cylinder C. Again, the big error in this design is, that cylinder C is a very large heavy metal block that consumes a lot of energy just to move it up and down because it is a piston that occupies the whole second chamber B, and which is further extended upward to contain the large discharge cylinder D. This glaring error is several times multiplied when this design of compressor is enlarged to have a diameter of 10 ft to 20 ft to work as a vacuum pamp driven by the water waves. The second error is that the gas leaks cannot be put back into the compression chambers. Further, this design cannot be expanded to 3 or 5 compression stages.

H. Referring to the U.S. Pat. No. 4,111,609 dated Sept. 5, 1978, by Anton Braun of Edina, Minn., U.S.A., a two (2) stage compressor using double acting pistons wherein there are no valves incorporated in the pistons. One advantage of this design is that it can be expanded to have three (3) or five (5) compression stages under one piston rod, but the big error in this design is, that there are so many chambers requiring construction of heavy walls to form the relatively large passageways around and in-between the compression chambers. The flat walls (not cylindrical) must be strong enough to withstand the high pressures specially when the diameter of the pistons are enlarged to work on big volumes, resulting to a very heavy metal block to house said compressor. The second error is, that the piston rod will be very long and too heavy just to move a few pistons—because of the distances, in-between the compression chambers, thru which said piston rod traverses. The third error is, that there are so many anti-leak packing requirements to seal gas leaks in-between chambers around the piston rod, thereby creating too much friction acting on the piston rod and resisting the free movement of said piston rod.

In summary, all the aforementioned prior arts failed to meet the requirements of the varying sizes of the water waves, aside from having low output/input Ratio.

SUMMARY OF THE SUBJECT INVENTION

The "Labrador Water-Wave-Energy Converter" is designed to solve all the aforementioned problems or impediments encountered preventing the commercial use of the aforementioned prior arts up to the present time. The subject energy converter is designed to work efficiently during ordinary weather and during violent weather as well, at the lowest cost of construction and maintenance, regardless of the sizes or varying amplitudes of the water waves, taking the opportunity to convert much energy during times of abundance.

There are eight (8) inventions being applied for patent under this presentation, namely: 1. the "Labrador Multi-Stage Axial-Flow Piston Compressor"; 2. the "Labrador Power Board System", which is a power transfer mechanism; 3. the "Type No. 1 Water-Wave Energy Converter System; 4. the "Type No. 2 Water-Wave Energy Converter System; 6. the "Type No. 4 Water-Wave Energy Converter System; 7. the "Type No. 5 Water-Wave Energy Converter System; 8. the "Type No. 6 Water-Wave Energy Converter System; 9. the "Water-Wave Anti-Oscillation Resistor for Floating Bodies". Note: Invention No. 5, the "Type No. 3—Converter System" has already been approved/allowed in application Ser. No. 06/820,082.

The following are the high lights of my inventions: 1. The "Labrador Multi-Stage Axial-Flow Piston Compressor", as illustrated by FIG. 1 and FIG. 2, being component No. 1 for Type No. 1 to Type No. 5 Water-Wave Energy Converters, has the following high lights and special advantages over the prior arts:

The bad effects of varying amplitude or sizes of the waves are solved by the ability of the chambers and pistons in series to trap and move the air forward even at a very small displacement made by the pistons. By alternately connecting the piston rod at varying points along the vertical length of the said pendulum bar of the power board system according to the varying waves sizes to correspondingly limit the displacements of the piston to the length of the compression chambers, and also, to increase or decrease the mechanical advantage of the Power Board upon the compressor. In this way, the piston will just be playing within the free length of the compression chamber thereby removing or avoiding the danger of destroying the whole structure during violent weather taking the opportunity to convert plenty of energy during its maximum abundance.

The optimum length of the compression chamber naturally will be much longer than the wave lengths during ordinary weather, therefor, low pressure compression is expected—but this is solved by the presence of one-way valves at both rear and front ends of the chambers and the one-way valves in the pistons even if the pump is one-stage only. These valves make the entrapped air to be flowing forward along the axis of the compressor at any magnetude of forward displacement made by the piston no matter how short because the pistons create low pressures at every rear side for the higher pressure entrapped air at every front side to move forward into. When the pistons move backward, the entrapped air at the rear sides will be squeezed to transfer thru the valves of the pistons into the front side of the pistons ready for further compression. Thus, high pressure is developed even the during calm weathers when the waves are small.

Advantages of the "Labrador Multi-Stage Axial-Flow Piston Compressor" over piston type compressors of the prior arts:

a. Fuel oil can be avoided in producing compressed air energy because it can be driven with high efficiency by the energy of the water waves;

b. It provides the opportunity to produce highly compressed air or to produce liquified gases because any forward movement of the pistons (whether small movement or big movement due to the varying sizes of the surfs), will always produce a further compression of the entraped air, and attains a very high pressure because all the gas leaks are trapped back to the compression chambers;

c. It provides a high speed production of highly compressed air and/or process of creating a vacuum because it may be constructed in various sizes such that the first stage may be made 20 feet in diameter but the pistons may remain thin and light;

d. The difference of air pressure between the front side and the rear side of each end wall is small, and therefore, there is a minimal requirement for anti-leak packing around the piston rod passing thru said end walls of each chamber, so there is less friction against the free movements of said piston rod;

e. There is much less energy spent when this compressor is the one used to create a vacuum because the piston at the last stage has a very small diameter that works against the constant atmospheric pressure out side, as the large diameter first stage pistons are built thin and light;

f. The gas leaks flowing back to the preceding chambers are totally (100%) pushed forward back to the succeeding chambers.

g. In an effort to maximize the efficiency of this newly invented multi-stage piston compressor, the distances between adjacent compression chambers have been eliminated by connecting the chambers in a straight single file line such that adjacent chambers have common end walls, by inter-communicating each chamber thru a one-way valve on every common end wall, by making said pump into an Axial-Flow Pump thru the use of one-way valves on all the pistons, by using only one piston rod for all the pistons, by making all the pistons light and thin, and the oil is circulated by the action of the difference in pressure created by the piston's forward stroke.

2. The "Labrador Power Board System", as illustrated in FIG. 3, is an "Impact Wall Power Transfer Mechanism" that converts the energy of the surfs into a concentrated push and pull force. Being component No. 2 of Type No. 1, Type No. 2, and Type No. 3 Water-Wave Energy Converters, in its simple construction in the form of an impact wall attached to a free hanging pendulum, said Power Board System has the following high lights and special advantages over the reference prior arts:

a. Where the prior arts stop working during violent weather due to the over sized waves rushing to the shore, the Free Hanging Pendulum-Type Power-Board takes the opportunity to work hard during those times of abundance without the danger of being destroyed because it is a free swinging board and the extra length of the over sized waves will just spill thru under the Power-Board as it gains elevation when it swings far enough. Therefor, the excess force of the unexpected over sized waves will not press so hard against the Power-Board after the piston has been pushed to the end of the chamber. Another safety procedure is that the piston rod will be connected to the vertical pendulum bar at a point where the expected furthest swing of the Power-Board will just be enough to push the piston to the end of the compression chamber. A hinge joint is provided at the lower third of the pendulum beam just above the impact wall to let the pendulum beam bend backward and relax the impact wall by the manipulation of the hydraulic jack control system in order to allow the over size surfs spill thru under the impact wall when ever the pistons are about to hit the end walls of the compression chambers thereby achieving safety to the whole structure while it will be working hard during violent weather taking the opportunity to convert plenty of energy during its maximum abundance;

b. To achieve a high ratio of energy production during fair weather when the water waves are generally smaller, the piston rod will again be connected at a lower point on the pendulum beam to increase the displacement of the piston so that more air is compressed at every stroke of the small waves;

c. The problem on the effects of rising high tides or varying water levels is solved by the floater pipes attached to the bottom of the impact wall to carry the whole pendulum frame floating vertically above the water as the suspension box housing connector at the upper tip of the pendulum beam frees said beam to move up or down, and by Floating Pipe Foundation Assembly over deep waters;

d. The problem of heavy action of water waves against the walls of the floating barge as presented by Smith is solved by my new design of a floating foundation which is in the form of 90% submerged pipe assembly laid horizontally on water on which the support posts of the power board is erected as shown in FIG. 5;

e. The problem of high cost of construction and maintenance in relation to energy output is solved by its simplicity of construction and by using low cost available timber materials and plastic materials;

f. The problem of too much energy of the water waves spent in splashing against the barge and in moving the barge up and down as presented by Smith is solved by eliminating the barge and by placing the Power Board System directly in front of the waves and directly bumping against the water waves or surfs.

g. In the second form of embodiment, wherein said Power Board System is constructed floating out on the ocean carried in between boats or plastic pipes floating side-by-side, it automatically adjusts itself to the changing elevation of the tides, thereby placing the Impact Wall right at the exact level of the surfs at all times, hence, convertion of the available energy of the surfs is maximized at least supervision;

h. It provides a barrier against the water waves to prevent erosion of the land on the shorelines while on the process of producing usable energy out of the water waves;

i. It provides a means to drive a piston-type compressor or piston-type water pumps, or other push-pull machines.

3The "Type No. 1 Water-Wave Energy Converter System" is an assembly of said invention No. 1 (the "Labrador Multi-Stage Axial-Flow Piston Compressor") together with said Invention No. 2 (the "Labrador Power Board System")—the impact wall power transfer mechanism that receives the energy, by direct impact from the water waves, and which drives said piston compressor, wherein the posts of said Power Board System are erected directly on the ocean floor on the shallow parts of the ocean. This machine, shown in FIG. 4 has all the high lights of said multistage compressor and the said power board system.

4. The "Type No. 2 Water-Wave Energy Converter System" is the same kind of assembly as the above Type No. 1 converter System, except, that the posts of said Power Board System are erected on a 90% submerged floating pipe foundations that are disposed floating out on the deep ocean where the ocean floor is not available for footing. In addition to the assembly, there is a wide-faced board that is horizontally disposed some 30 feet below the bottom rear end of said floating pipe foundation and attached to said pipe foundation by means of rigid struts to prevent vertical oscillation of said pipe foundation. Said wide-face board is the aforementioned Invention No. 9—named the "Water-Wave Anti-Oscillation Resistor for Floating Bodies". As energy storage is necessary, there is also provided an assembly of cylindrical air tanks to accomodate the compressed air produced by the compressors. Said tanks are also used as Power Transfer Mechanism by making the front tank carry said compressors in a vertical posture, so that, as said tank moves up and down, due to the surfs, it presses said compressor against their steady pistons being held in place by the steady rear ends of said floating pipe foundation. This Type No. 2 Converter System is illustrated by FIG. 5. The highlight of this machine is that it is self adjusting to the changing elevations of the tide water, it can work in violent weather, and it has said Anti-Oscillation Resistor in combination with said Oscillating Air Tank as second Power Transfer Mechanism.

5. The "Type No. 3 Water-Wave Energy Converter System" is the Invention No. 5, as illustrated by FIG. 6 in the parent Application Ser. No. 06/820,082, which has been already allowed, hence, it is not to be discussed in this application any more.

6. The "Type No. 4 Water-Wave Energy Converter System" is the Invention No. 6. It is a deck on top of a couple of floating air tanks that are being held by said deck at adjustable spacing in accordance with the prevailing wave lengths of the water waves. Said deck is held, stationarily floating over shallow parts of the ocean, by a vertical strong post that is directly driven into the ocean floor. Said post is being held rigidly vertical by guy ropes that are anchored to the ocean floor, and same post passed thru the center hole of said deck and extends up at least 8 feet above said deck during the highest level of the tide water, as shown in FIG. 7. A "Universal-Cross-Joint Bearing" with a large center ring is provided at the center hole of said deck to surround said vertical post and to act on said post when said deck makes a see-saw oscillation as the surfs move said air tanks up and down. Said ring may be provided with roller bearings that loosely surround the vertical post to reduce wear and tear and to allow said deck to move up and down along said post in accordance with the varying elevations of the tide. The said air tanks, which are preferably elliptical cylinders, are laid parallel to the lines of the water waves and are fixed to that position by means of a caudal tail or rudder attached to the center rear end of said deck. There are at least two said multi-stage axial-flow piston compressors, set at both top ends of said deck, that are systematically positioned and anchored to be freely turning left and right or up and down according to their positions in relation with the said vertical strong post. All the piston-rods of said compressors are centrally connected to a bearing ring that loosely surrounds said vertical post, at least five (5) feet above said deck. Said ring is provided with a compressive face against said vertical post. The high light of this design is that the compression process is done by pressing the compressors against said vertical post that is erected on the ocean floor by the see-saw movements of said deck due to the up and down oscillation of said floating air tanks. Said air tanks may be partially submerged during violent weather in order to keep it working during times of energy abundance while saving it from destruction. An additional safety device for said compressor is the hydraulically telescopic piston rod, in the form of two (2) piece pipes containing hydraulic fluids, which pipe is provided with bump switch that allows the transfer of said fluid into the outer pipe every time an over size surf strikes the floating air tank, in order to save the compressor from destruction.

7. The "Type No. 5 Water-Wave Energy Converter System" is illustrated by FIG. 8 which is another embodiment of a Power Transfer Mechanism wherein both the compression chamber and pistons are vertically moving up and down but in opposite direction to effect the compression process. As shown in the drawing, there is a plurality of floating air tanks spacedly held together, by a strong bar, in a straight line series of containers, in a formation that is oblique to the lines of water waves or even set loose along the direction of the waves. The first and the succeeding odd number tanks are paired to carry a common horizontal bar along the right line, near the center of the tanks, and perpendicular to the tanks, while the second and the succeeding even number tanks are also paired to carry a common horizontal bar along the left line, near the center of the tanks, and parallel to the first line of bars. Each said bar carry a vertically inverted compression chamber of said multi-stage compressor at its mid-span, while each air tank carry a vertically upward piston rod that is directly and correspondingly under each compression chamber. Said piston rod traverses the air tank and attached pivotably to the bottom of the tank. The hole at the top of the tank that accomodates the piston rod is made wide enough to allow oscillation of the tanks while the piston rod is oscillated to the opposite direction by the said strong horizontal bar. The bottom of each tank is tied to an anchor on the ocean floor by a rope to hold the tanks against the water waves. At least three calibrated weights are tied to said rope near the anchor to remove jerks upon the tank by the surfs. This design is my Invention No. 7.

8. The "Type No. 6 Water-Wave Energy Converter System" is illustrated by FIG. 9 and FIG. 10, which is another embodiment of a compressor that effects compression process by the up and down movement of the water surface getting into the enterior chamber of an open bottom floating capsule in a generally vertical posture. This means that the water, entering into the capsule thru its open bottom, acts as the piston that rams the entrapped air upward. The compressed air is then trapped by the float-ball valves in two levels. There is a plurality of one-way in-ward valves set on the peripheral windows of said capsule in two level also in order to allow fresh air to come into the chambers when the water surface moves down and out from the chambers corresponding to the valley of the water waves. A floater ring is disposed at the bottom rim of said capsule just enough to keep it afloat to its bottom, but allows the capsule to get submerged into the in-coming surfs. There is also provided a wide-faced board, horizontally disposed some 30 feet below the bottom of said capsule, named "Anti-Oscillation Resistor", to hold down said capsule against the up-rising surfs in order to press down said capsule against the rising water surface, thereby effecting compressions of the entrapped air. A sling anchor rope is also provided to keep said capsule stay up-right against the horizontal forces of the surfs. This design is my Invention No. 8.

9. The ninth invention is the "Water-Wave Anti-Oscillation Resistor for Floating Bodies", which is illustrated by part No. 207 in FIG. 5 and in FIG. 9. This wide-faced board is disposed horizontally at least 30 feet or deeper below the mean water surface where the water is not oscillating so that said board will remain steady and hard to pull upward by the said capsule, it being that its face is too wide to bump against the steady water in the deeps. This resister board may be attached to any floating bodies that needs to be steady against the influence of the water waves.

Other objects, aspects and advantages of my invention will in part be pointed out in, and in part apparent from, the following detailed description of one embodiment of the invention, considered together with the accompanying drawings.

DESCRIPTION OF THE PREFERRED EMBODIMENTS

Figure 1:
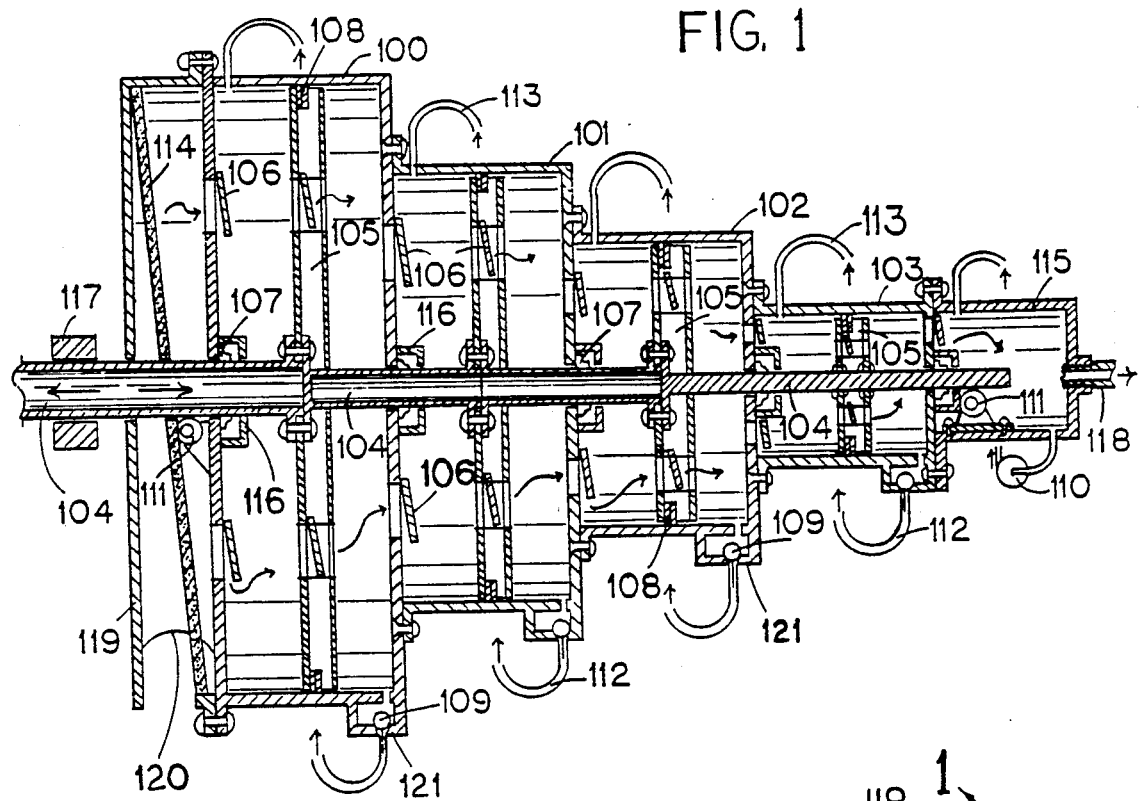
FIG. 1 is a longitudinal sectional view of the "Labrador Multi-Stage Axial-Flow Piston Compressor" pump taken along line 1—1 of FIG. 2.
Figure 2:
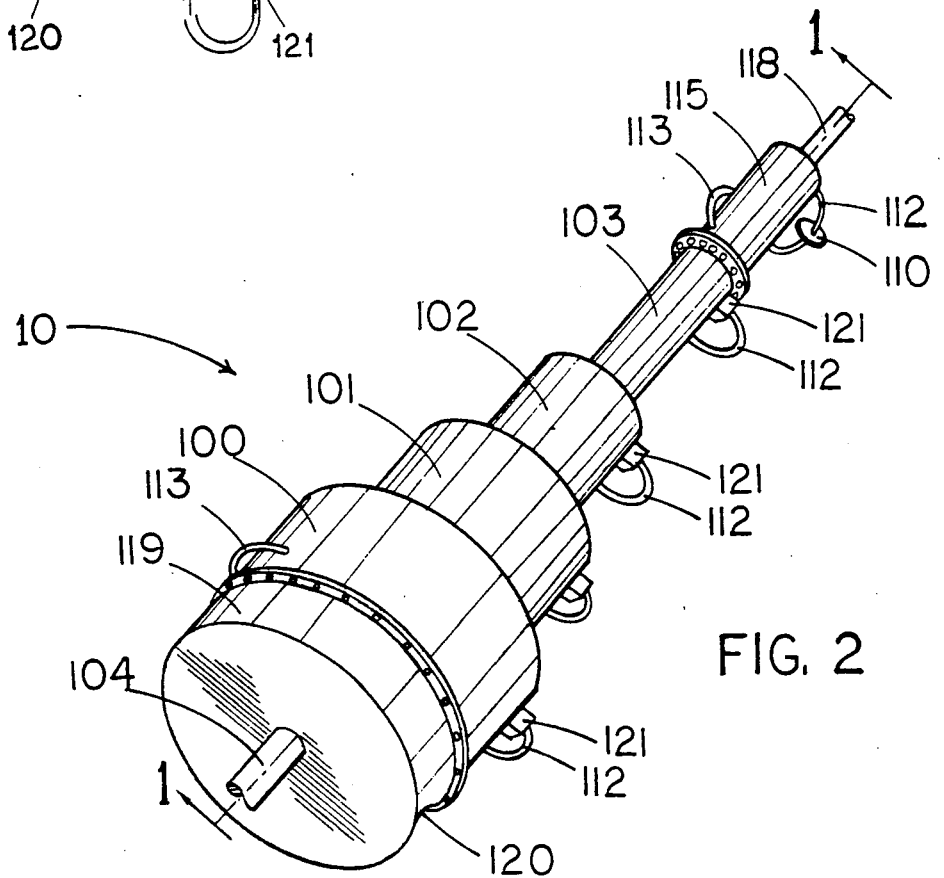
FIG. 2 is a schematic perspective view of the said "Labrador Multi-Stage Axial-Flow Piston Compressor" pump, showing an assembly of four (4) compression stages, a piston rod, the filter chamber, the bearing chamber, and the outlet air pipe.

Referring now to FIG. 1 and FIG. 2, there is shown an embodiment of the invention No. 1 named "Labrador Multi-Stage Axial-Flow Piston Compressor" pump generally indicated as part No. 10 and illustrating a design to be driven or operated by any machine that exerts a push and pull effort. Said multi-stage compressor No. 10 comprises a plurality of adjoining end to end compression chambers 100, 101, 102, 103, interconnected in a straight line series to have common end walls, and an extra end chamber 115 to contain a roller bearing 111 that carry the weight of the piston rod 104. In each chamber is provided with a piston 105 and a one (1) long continuous smooth surfaced piston rod 104 that interconnects and drives each said pistons altogether at the same time in a synchronous maner. Said compression chambers are cylindrical and of equal lenghts but differ in diameter from each other and so arranged that each suceeding chamber is 30% to 50% smaller than the preceding chamber, and wherein the first stage compression chamber is the largest while the last stage compression chamber is the smallest. This pump may be constructed to have ten (10) stage compression chambers for the handling of high pressure works, such as liquifaction of light gases. Each common end wall and each piston 105 is provided with at least Two (2) one-way valves 106 to make it into an axial-flow pump. An air sealer 107 is provided at each center hole of said common end walls where the piston rod 104 passed thru, to act upon the smooth surface of said piston rod in order to prevent the back flow of compressed air back to the preceding chamber. Each air sealer 107 is provided with a strong casing 116 to stop the piston 105 from bumping or crushing said air sealer during the rearward stroke. A pin-float-one-way valve 109 is disposed at the bottom outlet of the oil sump casing 121 to prevent the escape of compressed air back to the rear of each piston 105, after allowing all the oil to leave said sump. Said oil valve 109 sits and covers the oil outlet at the bottom of said sump 121 when it becomes empty, but floats during the rearward stroke of the piston 105 after enough oil is accumulated in the said sump 121, it being that the air pressure on both sides of said piston 105 becomes equal, and that said oil valve 109 will not be pressed down onto its seat. The oil tube 112 conveys the oil from the bottom outlet of said oil sump 121 and up to the rear top of the compression chamber thru the oil tube 113 that has a nozzle to spray wide said oil to the top interior surfaces of said chamber. The piston rings 108 will then catch said oil and spreads it all around the compression chamber. Some part of said oil are sprayed to the upper surfaces of the common end walls which conveys said oil down to the wall valves 106 and down to the said air sealer 107. The valve 106 at the piston 105 is lubricated by the oil coming down from the piston ring 108.

As the piston should not be touching or scrubbing the bottom interior surface of the compression chamber to prevent friction and wear, only the piston-ring 108 is allowed to touch the interior surfaces of said chamber, hence, the piston rod 104 must carry all the weights of the piston, hence, said piston rod must be acting s a rigid structural beam having a span equal to the total aggregate length of the four (4) compression chambers, as the air sealer 107 and the center holes of the end walls should not bear the weight of the whole weight of the piston/piston-rod assembly. It is, therefore, necessary to provide the roller bearing 111 (rear and front ends) to support the weight of said piston rod. It is not ideal, although it is allowable, to place said bearing 111 inside the compression chambers as it will occupy space separating the piston 105 from the end wall resulting to a large volume of air not being moved forward by the piston. The front end of said piston rod is, therefore, extended beyond the last stage chamber and the bearing chamber 115 is provided to house the roller bearing 111 at the front end, which condition requires an additional air sealer 107 to guard the additional center hole at the front wall of the last compression chamber. Again, the one-way valve 106 and the air sealer 107 at the rear end of said bearing chamber 115 are lubricated by another separate air driven oil circulation system part No. 110, or by what so ever appropriate type of lubrication system.

For more rapid liquifaction of light gases and most specially for more rapid creation of vacuum or the evacuation of vapors, said new multi-stage piston compressor pump may be constructed into a large pump having 15 feet to 20 feet in diameter for the first stage chamber and with longer chambers, but the pistons may remain thin and light since the first three to five stages have very low pressures. In this case, the span of the piston rod will be very long and, therefore, additional roller bearings 111, that is attached to the rear end wall, may be provided in every compression chamber to carry evenly the weight of the said piston rod 104, to prevent wear at the center holes of the end walls and on the lower interior faces of each chamber.

The filter chamber 119 is also provided to house the filter element 114 which prevents the spray of sea water from getting into the compressor. The bearing 117 is also provided to prevent lateral movements of the piston rod as it is being driven by the water waves. Said filter chamber is provided with an air vent 120 facing downward to serve as an entrance for fresh air. A delivery pipe 118 is secured on the other end of said chamber, thru which the high pressure air exits leading to a turbine or electric generator.

This new pump works in the following manner. As the piston 105 moves forward to the right, all the valves 106 of each of the pistons close, effecting air compression on its front to the right at the same time creating a partial vacuum on its rear on the left causing the compressed air to transfer to the next smaller chamber to the right, that is, from chamber 100 to chamber 101, from chamber 101 to chamber 102, from chamber 102 to chamber 103, and from chamber 103 to chamber 115 all at the same time with atmospheric air entering chamber 100 from air vent 120 on the far left thru the air filter 114, at the same time, as the valve 109 will be floating on oil, the difference in pressure between the front and rear of each piston will cause the oil to circulate to the top of each chamber to lubricate the piston rings, the valves and the sealers. On the backward movement of the piston all the valves 106 of the chamber walls will close causing the air on the rear side of the piston to transfer to the front side of each of the pistons all at the same time.

For high pressure works, this new pump may be constructed out of stainless steel, but for low pressure works, it may be made up of plastic materials or built-up lumber cylinders with plastic or rubber or leather for the piston rings and valves. Rust resistant materials are preferred to make this pump where it is near salt water or where acidic vapors are involved.

Figure 3:
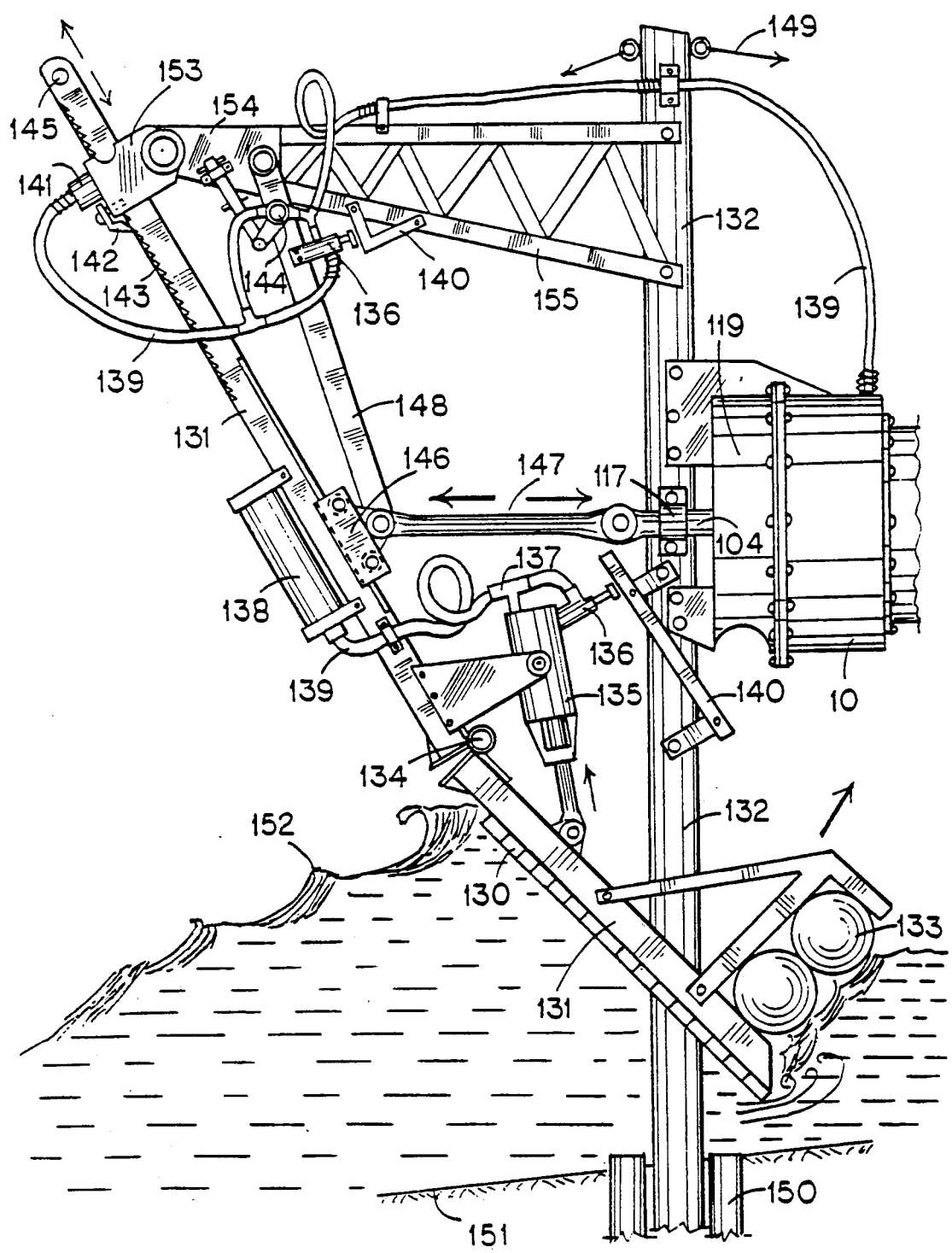
FIG. 3 is a side elevation of the impact wall power transfer mechanism, named "Labrador Power Board System", of the subject invention, showing the impact wall and pendulum bar with its support posts erected on the ocean floor, forming the Type No. 1 Water-Wave Energy Converter System" of the subject invention.

This new pump is most suitable for use for the convertion of water-wave energy because it meets the requirement of the varying amplitude of the surfs. It is also best suited for use as a vacuum pump since it may be constructed to have twenty (20) feet in diameter, anyway, it is the smallest last stage piston that works against the constant 15 pounds per square inch atmospheric pressure outside the end of the last stage chamber. It is also best suited for the liquefaction of gases, and for use in high altitude places where the air is rarefied and very thin, Referring now to FIG. 3, there is shown an embodiment of the invention No. 2 and impact wall power transfer mechanism named "Labrador Power Board System", which (with the said multi-stage compressor 10 mechanically attached to it as shown) constitutes a side elevation view of the Invention No. 3—the "Type No. 1 Water-Wave Energy Converter System", it being erected on the ocean floor. It is receives the direct impact of the water waves thru the wide faced impact wall 130 held by the pendulum frame 131 which transmits the energy of the waves to the compressor 10 thru a push rod 147. The main support posts 132, with its horizontal arm 154 to 155, comprises a minimum of two to form a vertical rectangular frame to suspend vertically the pendulum beam 131 thru a box connector 153. The pendulum frame, consisting of two pendulum beams 131 coupled together by impact wall 130, is provided with at least two float pipes 133, attached to the bottom and along the horizontal length of the impact wall 130, in order to carry the whole pendulum frame and keep it adjusted to the changing elevation of the tides at all times. Each of the pendulum beam 131 is provided with a joint 134 which enables it to bend backward, by means of the hydraulic control system 135 to 139, every time an over size surf strikes the impact wall specially during violent weather, in order to keep it working and take advantage of the abundance of energy on those times without endangering destruction of the machine. The push valve 136 will release the hydraulic fluids when it bumps with bumper 140. The pressurized tank 138 will force back the oil to the hydraulic jack 135 during the return cycle of the pendulum frame and the return cycle of the water wave will also help straighten up the pendulum beam 131. The box connector 153 will allow the the pendulum beam 131 to move up and down as it adjust to the elevation of the tides but it is provided with a pneumatic clamp 141 to hold the beam 131 every time the joint 134 relaxes as the push valve 136 will bump 140 to allow the compressed air from chamber 100 to get into the clamp 141. Rotary switch 144 will relax clamp 141 when the pendulum frame 131 comes to vertical position. The gear tooth 142 will hold the beam 131 thru straight gear 143 every time the surf (big or small) strikes the impact wall to prevent the impact wall from rising upward due to the swell of the water waves which affect floater 133. Traveling bearing 146 keeps sliding along the length of beam 131 as it is fixed in elevation by redundant bar 148. Guy wire 149 reacts against the action of the surfs and keeps the posts 132 in erect position. As the water waves strike the impact wall 130, it would cause the pendulum beam to move in the direction of the waves, and as this happen, the traveling bearing 146 transmits a resceprocating motion to the push rod 147 which in turn operates the multi-stage compressor 10.

This impact wall power transfer mechanism, may be used and erected on the sea shores or on the shallow parts of the ocean where the surfs usually break and make a splash, and where the ocean floor is available on which to erect the support ports. It may also be erected floating over the deep waters the convert the energy of the surfs.

The materials for the construction of this machine should be resistant to the chemical actions of the salt water, but for short term or seasonal operations the ordimaterials that are already available in the farms, such as bamboos and timber poles may used, and the use of the hydraulic controled joint 134 and the jack 135 may be eliminated because the summer season has no violent weather.

Figure 4:
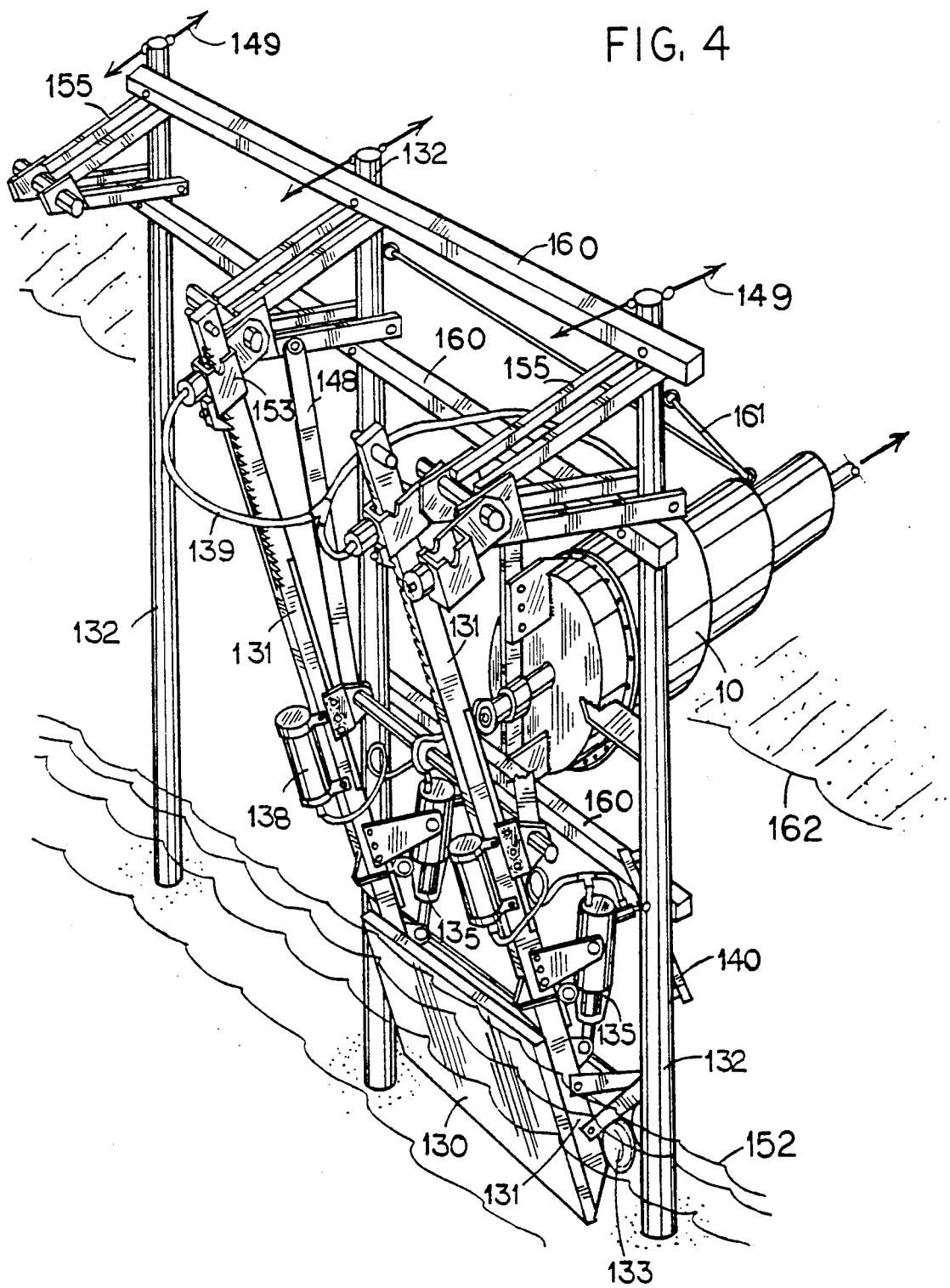
FIG. 4 is a schematic perspective view of FIG. 3, and is the same "Type No. 1. Water-Wave Energy Converter System", it being erected on the ocean floor.

Referring now to FIG. 4, there is shown a perspective view of the embodiment of the Invention No. 3 which is an assembly of said multi-stage compressor 10 and said Power Board System—an apparatus erected on the ocean floor to form the Type No. 1 Water-Wave Energy Converter System, acting as one unit. FIG. 4 also shows that a plurality or several units of this Type No. 1 Converter System may be jointly erected side-by-side using a common support post in-between units forming a long series of converters. This Type No. 1 Converter System is adaptable on shallow waters or on the seashore where the sea bed is available as foundation for the support posts. This machine, in combination with gas-turbine electric generator and electrolizer, will produce consumable energy in the form of compressed air, electricity, and hydrogen gas fuel in capsules. The Power Board System produces mechanical energy out of the kinetic energy of the water waves, the Multi-stage Compressor produces compressed air out of the mechanical energy of the Power Board System, the Air-Turbine Electric Generator produces electric energy out of the compressed air, and the electrolizer produces hydrogen gas fuel, oxygen and salt out of sea water by means of electric energy. This FIG. 4 further illustrates how a series of adjacent power boards are constructed in a long line with only one compressor for every power board. The parts shown in the figure have the same reference numerals as in FIGS. 1, 2, and 3 to avoid misidintification. The coupling brace 160 holds together the support posts in a series in equal spacing at the same time holds in place the compressor 10 with the help of the tension bars 161. Line 162 is the water edge on the seashore. Line 152 is the nose of the water wave striking the impact wall.

Figure 5:
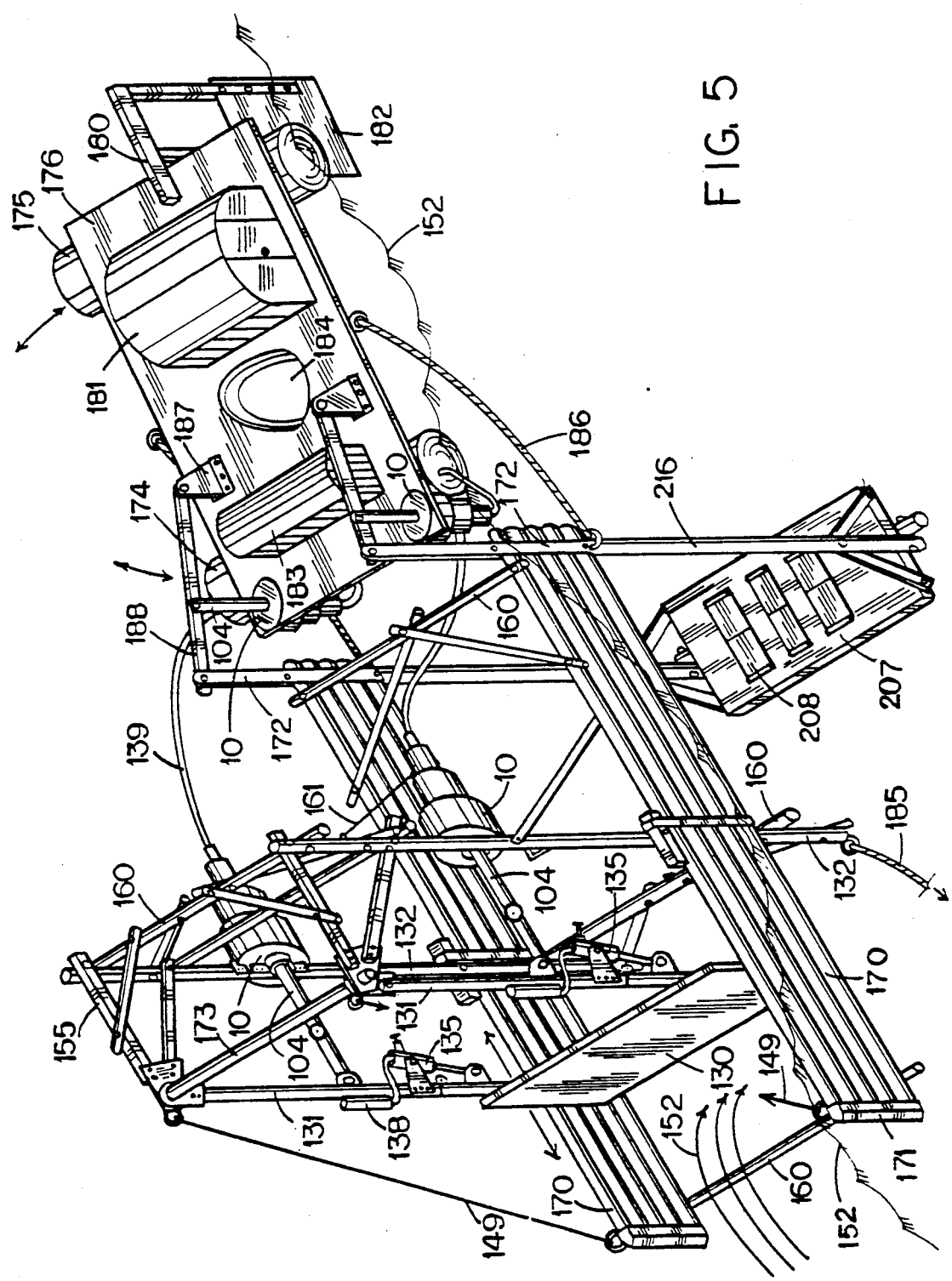
FIG. 5 is a schematic perspective view of FIG. 4 but it is erected on floating footings over the deep ocean, wherein said floating footings are provided with anti-oscillation resistor as part of an additional power transfer mechanism in the form of a floating see-saw air-tank barge and a drive bar incorporated therewith.
Figure 6:
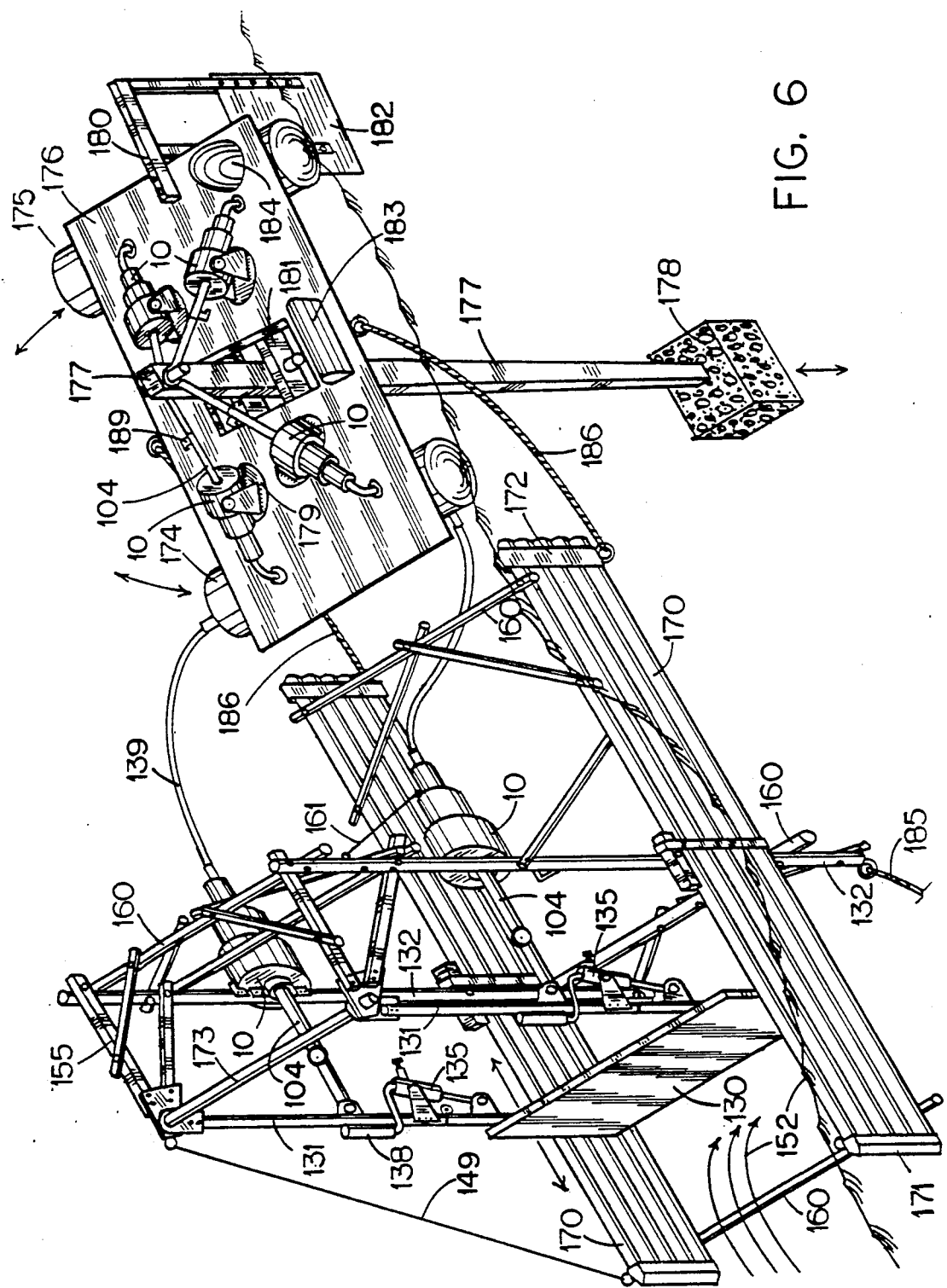
FIG. 6 is a schematic perspective view of FIG. 5, wherein a part of the floating see-saw power transfer mechanism is in the form of a rigidly vertical drive bar having heavy solid weight at its bottom tip at least 30 feet below the water level, which bar holds the piston rods of a plurality of multistage compressors that are being oscillated by the surfs thru the Floating See-Saw Barge structure.

Referring now to FIG. 5, there is shown a perspective view of the embodiment of the invention No. 4 comprising of a 90% submerged horizontal pipe assembly 170, long enough to span at least two crest of large size water waves, attached to and serves as footing for each of the support posts 132 of the power board system to make the whole converter system to be floating over the deep ocean without being oscillated by the water waves 152. Each of the footing pipes 170 are attached to the support posts in such a formation of a single vertical stack pile is order to form a thin bladed beam the easily slice thru the on-rushing surfs and thru the up and down motion of the waves. The front end of the pipe footing assembly 170 is provided with a straight vertical clip 171 which has a blade pointed against the waves, and at the rear end of the pipes is another clip 172 to keep the pipes in good formation acting as one strong beam. Anchor chain 185 is a "Y" type holding each of the bottom tip of the support posts and the lower one end is anchored to the sea bed on which the whole structure will be pivoting according to the direction of the waves. Since this is a single installation of a power board system, it is preferable to attached one multi-stage compressor 10 to each of the support posts to minimize unnecessary structural bracings. Guy wire 149 keeps the power board system stay erect against the heavy backward push by the water waves. The gas storage tanks 174 and 175 are tailing the floating pipe footing assembly 170 by means of tie rope 186 and by the pump drive bar 188. The two storage tanks are spaced far apart by the flat deck 176 to form a barg which carries the Gas-Turbine Electric Generator 183 the electrolizer 184, the cabin 181, and the two small compressors 10 to compress hydrogen and air. Storage tanik 175 stores the hydrogen gas produced by electrolyzer 184. Tank 174 stores compressed air from compressor 10 delivered by air hose 139. Drive bar 188 is necessary is keep away the barg 176 and to prevent it from rubbing against the rear end of the pipe footing assembly, at the same time, it pushes up and down the piston rod 104 to operate the small compressor 10, as the barge 176 makes a See-Saw movement by the swell of the water waves, pushing up and down the small compressor 10 against drive bar 188, while the pipe footing assembly 170 remains steady not being affected by the waves. Several apparatus of this kind be built all over the ocean around the world for the nations that need home made energy. Several apparatus of this kind may contribute compressed air to a central power plant in-land for the needs of industries. This invention No. 4 is hereby named "TYPE NO. 2 WATER-WAVE-ENERGY CONVERTER SYSTEM".

The Anti-Oscillation Resistor 207, that has upward one-way valves 208, is a large wide board positioned horizontally at least 30 feet below water surface, attached to the rear tip of the floating pipe foundation 170 by means of a rigid strong pipe 216 to prevent the floating pipe foundation 170 oscillating due to the action of the waves and to produce more force upon the horizontal drive bar 188 to operate the vertical piston rods into the smaller compressor 10. This Resistor 207 is, in effect, a part of the floating see-saw power transfer mechanism that operates the smaller compressors 10 disposed at the front edge of the barge 176 because, it prevents the vertical oscillation of the drive bar 188. The compression process is effected by the up and down oscillation of the compression chambers 10 which are being pressed against the steady pistons being held by the said drive bar 188. The floating air Tank 174 is being moved up and down by the surfs, hence, said smaller compressor 10 are also being forcibly moved up and down against their steady pistons.

Figure 7:
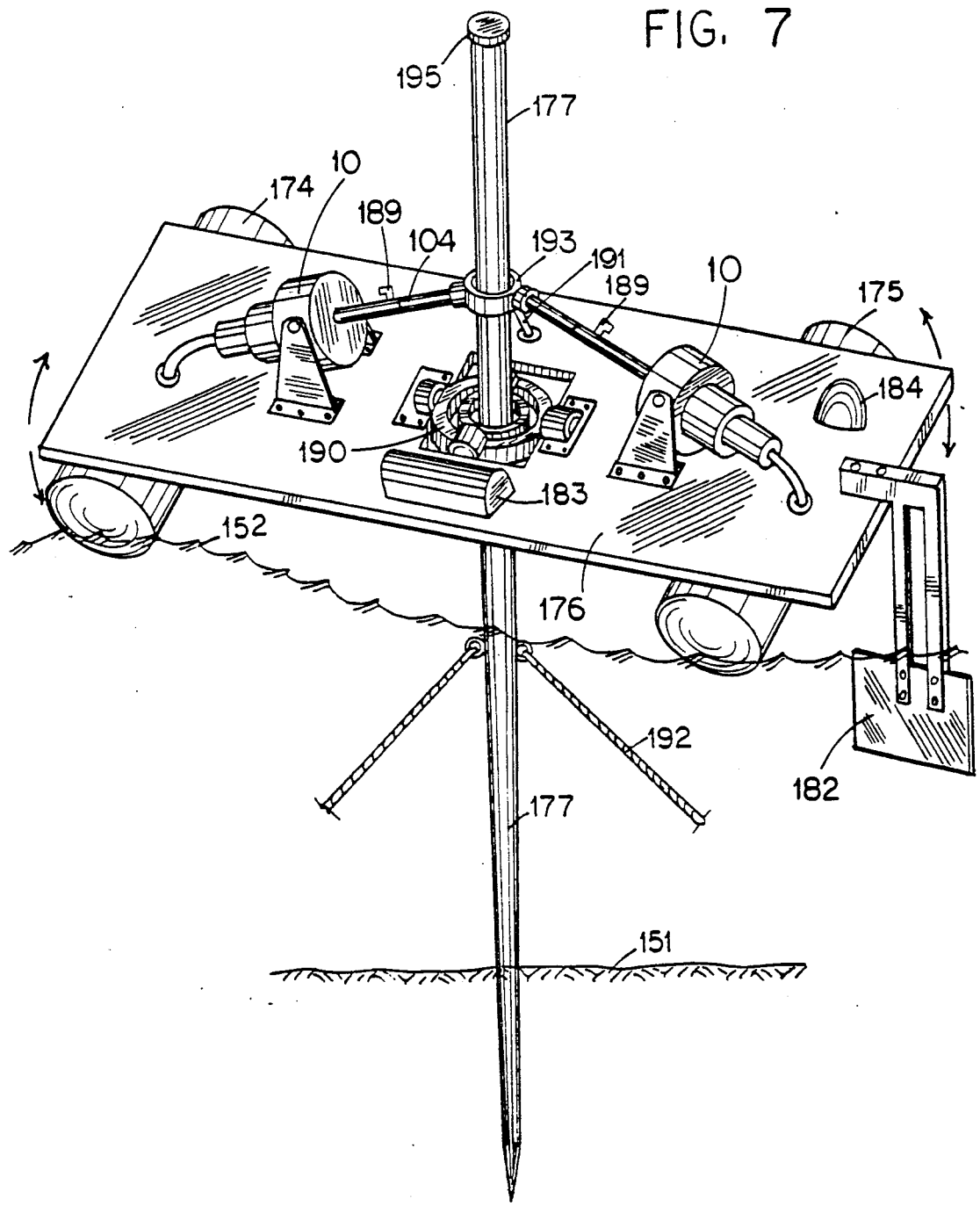
FIG. 7 is a schematic perspective view of the floating see-saw power transfer mechanism of FIG. 5, wherein said rigid drive bar is erected directly into the ocean floor at a vertical posture.

Referring now to FIG. 7, there is shown a perspective view of the embodiment of Invention No. 6, named "Type No. 4 Water-Wave Energy Converter System", wherein the drive bar of the floating see-saw power Transfer Mechanism is the in the form of a vertically fixed strong rigid bar 177 or a strong post that is erected on the ocean floor thru special footings or by directly driving into the sea bed. Said Bar 177 is keepped rigidly vertical by guy ropes 192 anchored to the sea bed. The flat deck 176 which holds the compressors 10 pivotes about the rigid bar 177 by means of a loose ring connector 190 which is in the form of a universal joint. Connector ring 193 is also loose in relation to bar 177 in order to allow the whole Flat Deck 176 to move up or down the length of Bar 177 to adjust with varying elevation of the tides. Strut 191 fixes the elevation of ring connector 193 in relation with deck 176. Piston Rod 104 is provided with a hydraulic switch adjuster 189 as an automatic Piston Relaxer every time the over sized water waves move up the air tank 174 and 175 to avoid destruction of the compressor. Caudal Board 182 keeps the Flat Deck in correct position in relation with the waves. This machine is provided with an air driven electric generator 183 and an electrolizer 184 both anchored on top of said deck for the production of hydrogen gas fuel of the sea water.

Figure 8:
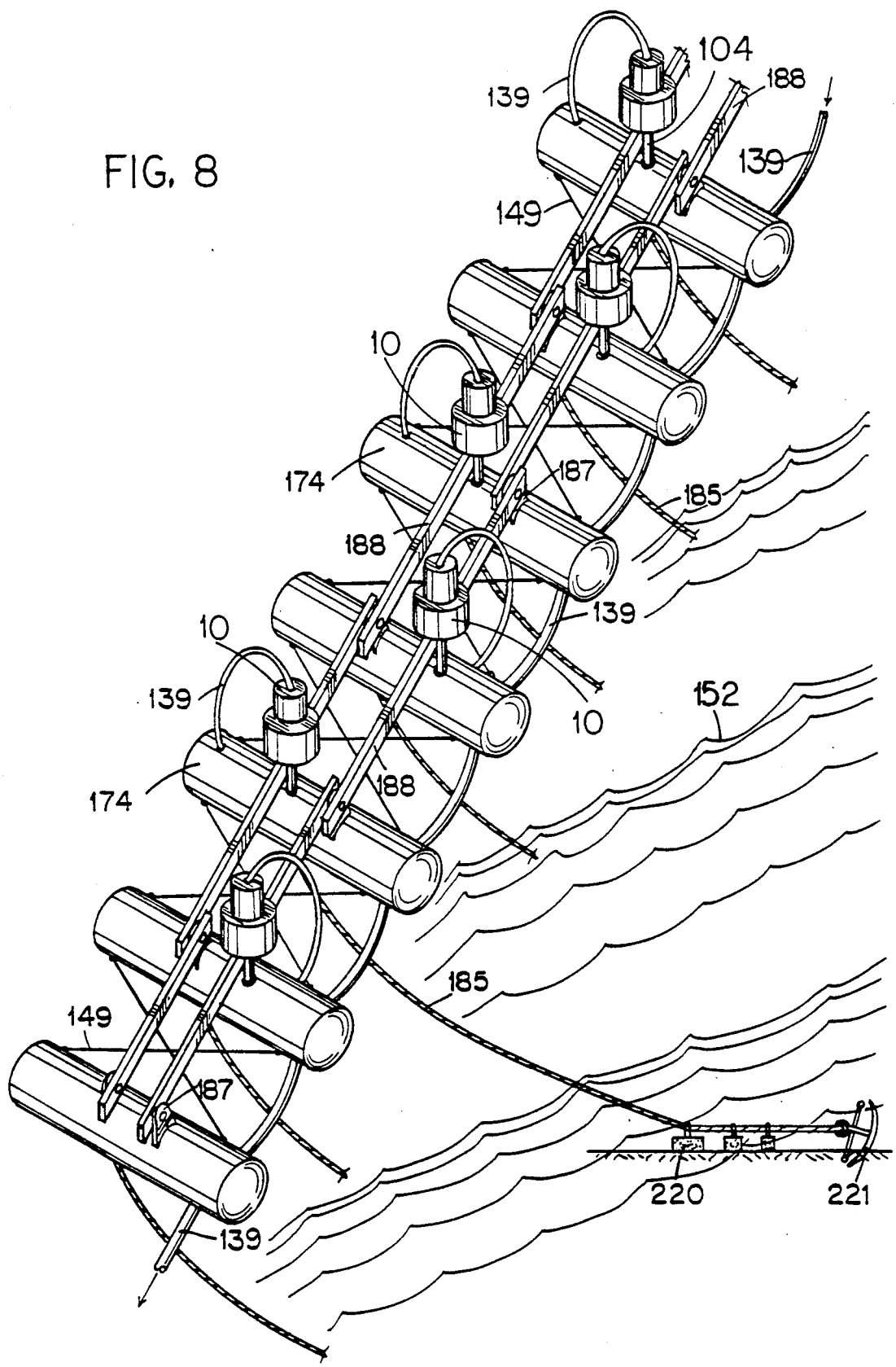
FIG. 8 is a schematic perspective view of another embodiment of the floating see-saw power transfer mechanism, wherein the said drive bar inter-connects two floating air tanks and a third air tank floats in-between said two tanks. The compression chambers are carried by said bar, while the piston rods are carried by said tanks, thereby, the chambers and the piston rods oscillate against each other: A plurality of this arrangement are inter-connected to form a long series of tanks.

Referring now to FIG. 8, there is shown a perspective view of the embodiment of Invention No. 7, named "Type No. 5 Water-Wave Energy Converter System", wherein the floating see-saw power transfer mechanism is in the form of a horizontal bar 188 carried at both ends by spacedly disposed floating cylindrical air tanks 174. A multistage compression chamber 10 is disposed vertically inverted on the middle top of said bar 188. A third tank 174, of the same size and shape as the first two air tanks, is disposed in between and parallel to said first two tanks and carries a vertically upward piston rod 104 that gets into said inverted compression chamber 10. The compression process is done by the up and down alternate movements of said floating air tanks 174 by the action of the water waves. A large scale apparatus of this kind is a series of floating air tanks arranged in a long straight line fixed obliquely to the direction of the waves or even set loose along the direction of the waves. It is composed of cylindrical Air Tanks 174 alternately connected to each other by strong drive bar 188 which firmly hold the compressor 10 in a vertical position on top of every tank. Each piston rod 104 penetrates the corresponding tank that holds it by a connector at the bottom of each tank to make the tank fixed in one position. Each drive bar 188 carry one multi-stage compressor 10 which is held firm against the piston 104 being pushed up and pulled down by each tank 174. As the water waves move up one tank 174 the corresponding piston rod 104 moves up into the compressor 10 at the same time the succeeding next tank moves down on the valley of the waves moving down the compressor 10 against the rising piston effecting the compression process on the first pump at the same time effecting the suction process on the second compressor, and so on. The weight 220 hanging on the anchor rope 185 is the shock absorber against jerk on the rope 185 due to the action of the waves on the tanks. Cross-Brace Ropes 149 are provided to brace the tanks to make them stay squarely in relation with the drive bars. The compressed air stored in each of the tanks 174 is delivered to the power station or to the factory thru the air hose 139 which is connected to all the floating air tanks 174. The vertical hole thru each tank 174, thru which each piston rod 104 passes thru, is elongated along the length of said tank 174 in order to allow said piston rod 104 to play with said tank 174 as the right end of said tank will be rising ahead of the left end due to the oblique action of the surfs. The length of said drive bar 188 is made adjustable such that the spacing between said tanks 174 is equal to ½ wave-length of the monthly prevailing sizes of the surfs. Said floating air tanks 174 are made partially submerged during violent weather in order to prevent destruction of the apparatus and to keep it working during the times of energy abundance. The sizes of the said floating air tanks 174 and the said Multi-Stage Compressors 10 depends upon the prevailing sizes of the water waves in the selected project site.

Figure 9:
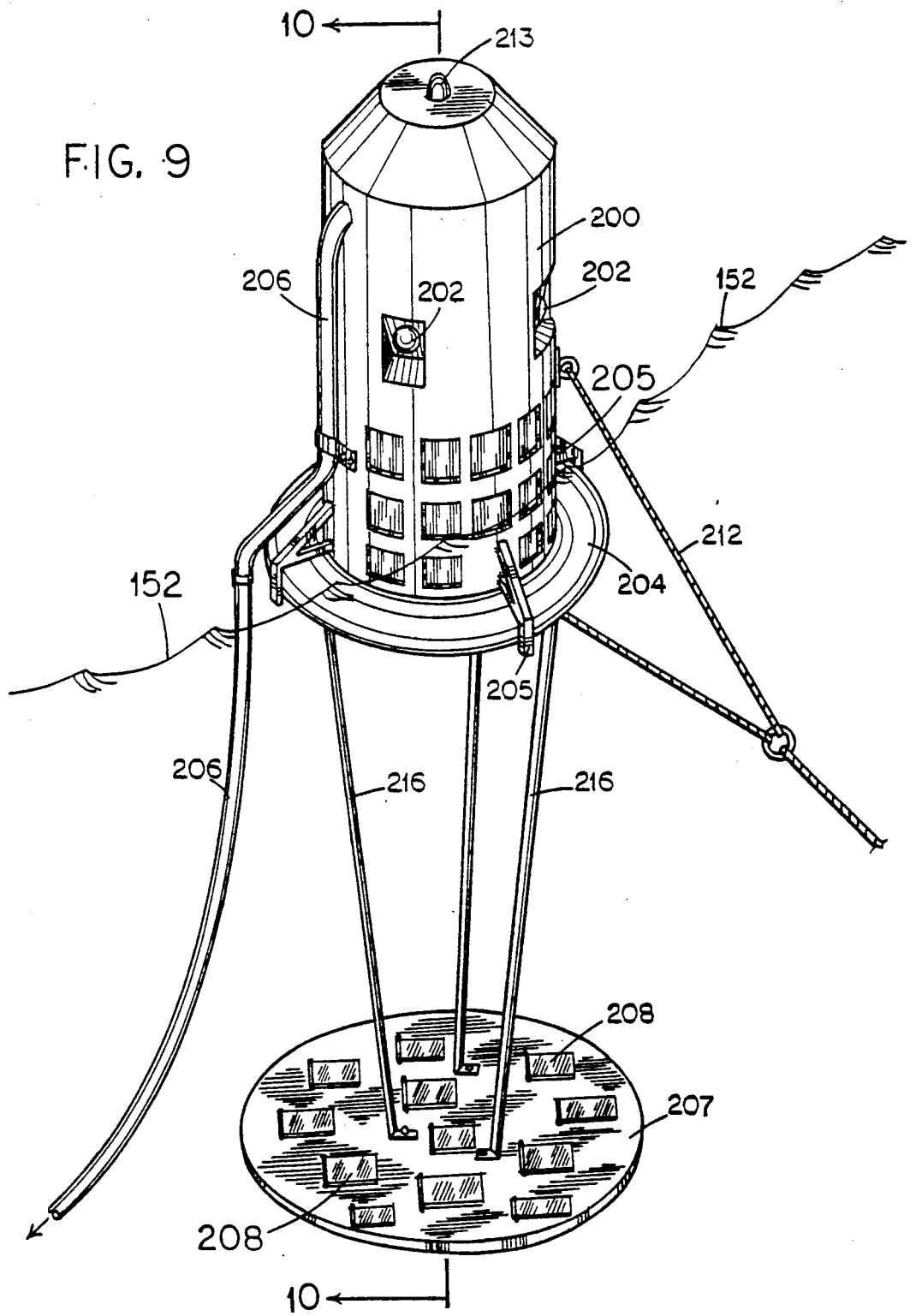
FIG. 9 is a schematic perspective view of another embodiment of this invention, wherein the power transfer mechanism is in the form of said horizontal wide board acting as an oscillation resistor as shown in FIG. 5, that holds down a compression chamber against the rising water wave as piston getting into said chamber.
Figure 10:
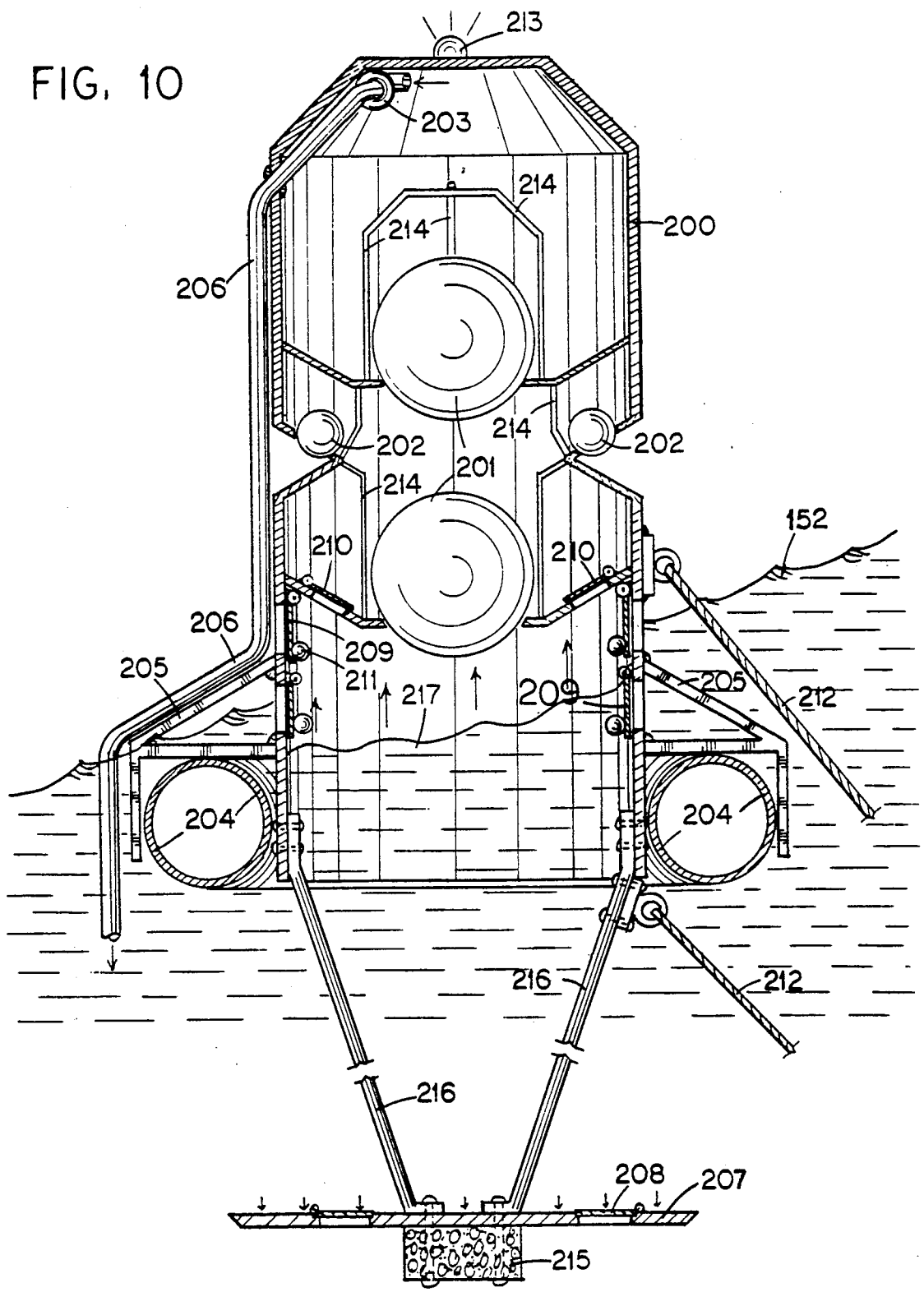
FIG. 10 is a longitudinal sectional view of FIG. 9.

Referring now to FIGS. 9 and 10, there is shown an embodiment of my Invention No. 8, which is hereby named "Type No. 6 Water-Wave Energy Converter System", which is a two (2) stage water-piston compressor, and wherein said Wide Face Baord Anti-Oscillation Resistor, as shown and as used in FIG. 5, also serves as the Anti-Oscillation Resistor Power Transfer Mechanism to compress air in Capsule 200. The whole system is keepped afloat by the ring floater 204. It is keepped rigidly vertical against the horizontal forces of the waves by the Sling Rope 212 and by the Oscillation Resistor 207 which is held rigidly down by redondant beams 216 at least 10 feet below the water surface. The Oscillation Resistor 207 prevents the whole system from going up every time the water waves 152 come in, at the same time Sling 212 acts the same way, thereby pressing the main body 200 against the rising water surface 217 as shown in FIG. 10 thereby effecting the compression process.

FIG. 10 is a longitudinal section of FIG. 9 thru line 2—2 illustrating the internal mechanism of the whole system. When the water surface 217 rise up into the system, the entraped air is compressed upward lifting the Float Valve Balls 201 and the one-way valve 210 to let the air into the lower chamber and into the upper chamber if the water wave is big enough to make the water surface rise above the lower valves. When the water rises above any of the valves, the ball valves 201 and 202 will just float releasing the water down but closes to trap the air when the water is gone. The valves 202 and 209 contribute to the rapid entrance of water into the chambers thru the side walls of the main body 200 to take advantage of the large available energy of the waves during violent weather. The lower float valve 201 keeps the compression process going on even during calm weather when the waves are small because the headroom of the rising water piston is made low which make it easier to push the compressed air past the lower main valve 201. The air turbine 203 supplies electricity to the warning light 213. Cage 214 limits the play of float valves 201 and 202. Pipe 206 delivers compressed air to the power station. Weight 215 keeps the whole system to an erect position specially during violent weather. Structural brace 205 holds the ring floater 204 in place. The one-way valves 208 of the oscillation resister 207 facilitate the downward movement of the system in accordance to the lowest valley of the waves to maximize the amplitude of the water piston. Side valves 202 and 209 bring in new air into the chambers when the water surface 217 recedes down.

A plurality of this capsule water-piston compressor, which may be in the form of elongated square boxes, may be ajoinly attached to each other to form a long line of a series of compressors having common side walls between adjacent capsules—thereby forming a rigid floating sea wall to obstruct the water waves at the same time producing energy out of the surfs. This said capsule compressor pump is able to work during violent weather because it can get submerged into the large water waves without being destroyed.

All materials for this compressor and for all the other types of energy converter systems must be resistant against the effects of salt water.

I claim:
1. I claim a multistage axial flow piston compressor pump, that is capable of being formed into a multi-stage compression chamber pump, having several stage pistons all under one piston rod, that is driven by the energy of the water waves thru various types of power transfer means that converts the energy of the water waves into a concentrated push and pull mechanical force, or operated by push and pull machines/engines in order to effect compression/liquifaction of gases or to create a vacuum thru a one-way axial-air-flow process towards the smallest chamber, and which is capable of being constructed into a large diameter pump, as compressor but more for a vacuum, but the pistons are kept thin and light, comprising:
 at least two adjoining end to end compression cylindrical chambers of equal lengths with common end walls, decreasing in diameter by chamber after chamber, the last being of the least diameter;
 a circular piston of corresponding size having piston rings of appropriate types in each said compression chambers, having forward and reverse strokes in said chambers, and movable in response to the actuations of the driving piston rod;
 a long straight continuous single smooth-surface cylindrical pipe piston rod that passes thru the center holes of the end walls of each and all the said chambers from the first stage to and ending at the last stage, which holds and moves back and forth each said pistons in all the said chambers at the same time in a synchronous movement, the full length of which starts from the connector at the driving structure—then passing thru a control bearing—then thru the filter chamber—then thru the first stage chamber—thru the succeeding stage chambers—and ending at the bearing chamber 115 where its end portion is carried by a roller bearing 111 to relieve the piston rings from carrying the weight of the pistons, and to prevent rapid wear;
 at least two circular or ball-type one-way valves set at every end wall of all the said chambers and at each of the said pistons except at the forward end wall of the said last stage chamber which has only one one-way valve, to effect the axial flow of compressed air along the length of said compressor;
 a cylindrical or ring-type air sealer of appropriate materials, to prevent the back flow scape of compressed gas through the passage of the piston rod, set at the center holes of the end walls of each said chambers and acting on the smooth surface of said piston rod;
 a roller bearing 111 installed at the rear end wall of each compression chamber to support evenly the weight of the piston and piston-rod assembly, in order to prevent rapid wear at the center hole of said end walls where the piston rod passes thru, and to prevent the piston from scrubbing the bottom interior surface of the compression chambers;
 a control bearing 117 to guide the rear section of said piston rod outside the front wall of the air filter chamber;
 an oiling system or an air operated oil circulation system in each chamber to lubricate the piston rings, cylinder walls, the air sealers, the valves, and the piston rod surface;
 a pivot bearing connector at the rear end of said piston rod; an air vent with filter to serve as an inlet of atmospheric air into the pump but prevents water spray to get into the pump; and a delivery pipe to deliver compressed gas from the last said stage of the pump to the compressed gas reservoir or storage tank.

2. A plurality of water wave energy converter system, in accordance with claim 1, wherein the support posts of said impact wall become common posts between adjacent independent set of converter machines, thereby forming a long line of sets of apparatus parallel to the lines of the water waves.

3. A multi-stage piston compressor, in accordance with claim 1, wherein said compressor is constructed to have four or ten stages of compression chambers in a straight line under one piston rod, which is driven by a motor or by engine to liquify gases or to create a large vacuum space.

4. A water-wave energy converter system in accordance with claim 1, wherein, for the same purpose of using and driving said multistage axial-flow piston compressor pump for the production of usable energy out of the surf energy, said pump is disposed to be driven by an impact-wall power transfer mechanism which is directly erected on the ocean floor along the shorelines or on the shallow waters of the sea where the surfs usually break up, comprising:

a multistage axial-flow piston compressor pump, in accordance with claim 1, disposed to be driven by said impact-wall power transfer means by horizontally attaching it to the middle-third of each of the support posts of the impact wall power means;

said impact-wall power transfer mechanism that converts the energy of the water waves into a concentrated push and pull mechanical force by way of a direct smash of the water waves upon a wide face impact wall that is attached to a pair of rigid pendulum beam supported by posts erected on the ocean floor, that serves as prime driving machine, to drive the piston rod of said compressor pump, comprising:

an impact wall, made of wide rectangular face board of appropriate materials and strength, disposed parallel to the surfs at an appropriate elevation to receive the energies of the breaking surfs;

a pair of support posts vertically erected on the ocean floor at a distance between them enough to allow the horizontal length of said impact wall to pass thru;

a plurality of guy ropes to keep said posts erected;

a coupling structural horizontal truss to interconnect said posts at the top to form a rigid rectangular frame;

a forward horizontal arm structure attached to the top of each said post and fixed by braces with said coupling structural truss to make it rigidly perpendicular to the surfs;

a free pivot box connector, having a pneumatic clamp, pivotally connected to the outer tip of said forward horizontal arm;

a pair of structural pendulum beams hanging thru said pivot box connector, having a stopper pin at its top end;

a straight gear attached along the upper section front side of each said pendulum beam;

a lock tooth gear, that bites on said straight gear, to hold and prevent said pendulum beam from rising upward due to the swell of the water waves;

a flexible air hose to supply compressed air from the compressor to said pneumatic clamp at the box connector to effect holding at the upper end of said pendulum beam at the time a surf strikes the impact wall;

a traveling bearing connector, clamped to said pendulum beam by roller wheels, that moves freely along the length of said beam;

a redundant bar, vertically disposed to be freely swinging with said pendulum beam, pivotally connected by its upper end to the horizontal arms of said support posts and connected by its lower end to said traveling bearing to fix the elevation of same on level with said multistage compressor;

a rotary valve attached to the upper side section of said redundant bar and interconnecting said flexible air hose to regulate compressed air for said pneumatic clamp;

a push valve, attached to the upper section of said redundant bar and incorporated with said flexible air hose, to allow compressed air into said pneumatic clamp pivot connector;

a bumper, attached to the bottom middle section of said horizontal arm, to act on said push valve when said pendulum beam swings too far back;

a structural push bar, pivotally connected by its left end to said traveling bearing connector of the pendulum beam and its right end mechanically connected to the rear end of the piston rod of the said multistage compressor pump, thru which the said compressor is driven or operated by said pendulum beam;

a tension bar or rope that is attached to the further third of said multistage compressor pump and tied to the top of said support posts to keep said compressor pump at a horizontal posture;

a pivot hinge joint connector interconnecting the bottom end of said pendulum beam to the top end of the beam frame of said impact wall board assembly;

a stopper compression face provided at the bottom end of said pendulum beam and at the top end of the beam frame of said impact wall to make said two beams stay aligned together as one rigid beam during the return cycle of the water waves;

a hydraulic jack control system, pivotally interconnecting the bottom section of said pendulum beam to the top section of said impact wall beam, that automatically relax to allow said impact wall to bend backward to allow the over-size surfs to spill thru under said impact wall;

a push valve at the upper side end of said control jack to release the hydraulic oil content of said jack when said pendulum swings too far back;

a pressurized oil storage tank attached to said pendulum beam at a higher level than said jack;

a one-way valve disposed at the upper end of said jack to allow oil returning into said jack;

a flexible hydraulic hose intercommunicating said jack with said pressurized oil tank thru said push valve and thru said one-way valve;

a structural plate upon which said control jack is pivotally mounted and connected to the back side of said pendulum beam;

a bumper structure, disposed at the said support post, to act upon said push-type valve switch of said jack at the time an over-size surf pushes said impact wall too far back, to make said impact wall give way to the surf;

at least one floater pipe disposed along the bottom length of said impact wall to carry the whole weight of the impact-wall-pendulum-frame assembly afloat on water to adjust said impact wall to the changing elevation of the tide water;

a bumper structure disposed horizontally at the said support posts to stop said pendulum beam when it swings too far back due to over size surfs, and an air pipe line disposed at the end of the last stage chamber of said compressor pump to deliver compressed air to the reservoirs inland or out under the ocean.

5. A water wave energy converter system in accordance with claim 1, wherein, for the same purpose of using said multistage axial-flow piston compressor pump for the production of usable energy out of the water waves, said pump is disposed to be driven by a floating see-saw power transfer mechanism which is an oscillating flat deck having one steady vertical drive bar, disposed thru its center hole, upon which the compression chambers of a plurality of pumps are radially pressed against, said flat deck barge being afloat over the deep ocean, comprising:

section a: at least four units of said multistage piston compressor pumps, two of which are opposedly disposed at the front section of said barge, each pump correspondingly pointing to the left and to the right front corners of said barge, the other two pumps are opposedly disposed against the first two, and likewise, each pump correspondingly pointing to the left and to the right rear corners of said barge, each rear end of the piston rod of all said pumps radially and slantly points to the center of said barge, each pump being sitted on a swivel footing 179 that allows said pump to turn horizontally and to tilt up and down in response to the oscillation of said barge;

section b: said floating see-saw power transfer mechanism, comprising:

at least two circular or elliptical cylindrical air tanks of a sufficient size easily oscillated by the average size of water waves in the selected project site, coupled together by structural beams to a distance between them equal to one-half wave-length and being adjustable from time to time according to the seasonal wave-lengths, a rust resistant floor fastened on top of said beams to form a flat deck on which said pumps are anchored and to serve as work area and to accomodate other driven machineries;

a caudal tail or rudder board, made of light thin materials on a strong frame to form a wide-face wall, attached to the middle of the rear tip of said deck by means of a strong structure arm to keep the said wide faced wall vertically submerged in water and aligned with the center line of said deck rigidly in order to keep said floating air storage tanks stay parallel to the water waves;

a "Y" sling anchor rope correspondingly tied to the mid-point of the left and the right sides of said barge and the third end anchored to the ocean floor where an appropriate weight is attached to said rope at about 5 feet-20 feet from the ground anchor block to remove jerk force on said rope as violent surfs will be splashing on said barge;

a float valve at the bottom and an air valve at the top of each said air tanks to allow water in and out of said tanks in order to partially submerge said barge during violent weather;

a rigid bar that stands vertical sufficiently above said deck and extends down sufficiently under water below said deck thru a hole at the center of said deck, being connected to said deck by means of a free pin connector-bearing across said bar and across the main structural beams of said deck that serves as pivot pin for said rigid bar;

a fixed pin connector at the top end of said vertical bar to which all the rear ends of the piston rods of said pumps are operatively connected thru an eye-bearing at said rod ends, such that said pumps are being pressed against said steadily vertical bar when the surfs move up one end of said barge;

a solid block 178 of appropriate weight attached to the bottom tip of said vertical rigid bar to make said bar stay rigidly vertical against the horizontal forces of the piston rods at the top end of said vertical bar;

said piston rods are made telescopic in the form of hydraulic pipes which are provided with bump switches to release the hydraulic oil when the amplitude of the water waves goes beyond safe limits;

an electric generator 183 driven by air turbine installed on said deck to produce electricity out of the compressed air;

an electrolizer 184 installed on said deck to produce hydrogen gas and oxygen out of the electricity produced by said generator;

a small cabin 181, constructed on said deck to serve as shelter for the operator and for a warehouse;

an air hose 139, to deliver compressed air to air tanks inland.

6. A water-wave-energy converter system in accordance with claim 1, wherein, for the same purpose of using and driving said multistage axial flow piston compressor by the energy of the water waves, thru the use of a floating see-saw power transfer mechanism, for the production of compressed air, a plurality of said multistage compressor pump are disposed to be driven by an oscillating flat deck that is held in place thru its center hole by a post vertically erected on the ocean floor comprising:

said floating see-saw power transfer mechanism which is in the form of a flat deck barge with a hole at its center, said deck being on top of two spacedly parallel elliptical cylindrical air tanks, adjustably spaced at ½ wave length, said air tanks being disposed parallel to the lines of the water waves;

at least four units of said multistage axial-flow piston compressor pumps in accordance with claim 1, two of which are opposedly disposed at the front section of said barge, each pump correspondingly pointing to the left and to the right front corners of said barge, the other two pumps being opposedly disposed against the first two, and likewise, each pump correspondingly pointing to the left and to right rear corners of said barge, each rear end of the piston rod of all said pumps points to the center of said barge, each pump being sitted on a swivel footing that allows said pump to turn horizontally and to tilt up and down in response to the oscillation of said barge;

a drive bar disposed vertically erected on the ocean floor, having a hard smooth cylindrical surface, tall enough to have its head standing out at least ten feet above the highest tide water level, which pierce thru the center hole of said power-transfer flat deck, upon which the said deck pivots as it makes a see-saw ocillation by the surfs;

a universial joint that serves as bearing for said drive bar, securely and horizontally attached to the center hole of said deck, which has a center ring wide enough to be free and clear around said vertical drive bar to allow said deck to move freely up and down said bar in accordance with the changing tides;

said deck being in the form of iron grill having enough perforations to allow the surfs to spill thru during violent weather;

a ring bearing, wide enough to be clear around said vertical drive bar, disposed at least 5 ft above said universal joint, which serves as bearing upon the surface of said drive bar, which holds the piston-rods of said multistage compressors at a slant posture by means of a ball-joint bearing connector, to make the piston rod stationary in relation with the oscillating compression chambers;

a rigid strut, a redundant structural member, to fix the elevation of said bearing ring in relation with said deck, the upper end of which is connected to said bearing ring by a ball-joint, likewise, its lower end connected to said deck by a ball-joint;

a rudder board submerged in water mounted at the tail end of said deck by means of connector vertical arms to keep said deck stay perpendicular to the water waves;

a guy rope attached to the said bar at the point of the lowest tide elevation, and anchored to the ocean floor to make said post stay rigidly vertical;

a telescopic piston rod to connect the compressor pump to the said bearing ring, having an automatically adjusting length in accordance with the excessive wave-length of the surfs during violent weather thru a bump switch that releases the hydraulic oil content of said rod, in order to prevent destruction of said pump by the violent surfs; and an air pipeline, connected to the outlet of said pump and to said floating air tanks and from said air tanks to large reservoirs inland or under the ocean, to deliver the compressed air for use or for storage.

7. A water-wave energy converter system in accordance with claim 1, wherein, for the same purpose of using and driving said multistage axial-flow piston compressor by the energy of the water waves, thru the use of a floating see-saw power transfer mechanism, for the production of compressed air, a plurality of drive bars are arranged in two parallel horizontal lines and overplapping each other on top of and interconnecting a long series of floating elliptical-cylindrical air tanks, forming a straight line apparatus, set out floating on the ocean and oblique to the lines of the water waves, comprising:

a multistage axial flow piston compressor pump, in accordance with claim 1, that is disposed vertically inverted on the middle top of each said drive bars;

said floating see-saw power transfer mechanism that converts the surf energy into push/pull mech. force comprising:

a plurality of cylindrical air tanks set afloat on the ocean, spacedly parallel to each other, individually anchored to the ocean floor, and forming a long line of air tanks oblique to the water waves;

a plurality of horizontal drive bars, arranged in two parallel lines in an overlap formation, perpendicular to and across the middle third of said air tanks, the first line of drive bars on the right interconnecting the odd number tanks, while the second line of drive bars on the left interconnecting the even number tanks, each drive bar carry one said multistage compressor pump disposed vertically inverted at the top-mid-point of said bar;

each said air tank carry, at its middle third, one vertically upward piston rod that gets into each corresponding compression chamber;

each said tanks provided with vertical bracket plate connectors standing on top of the middle-third of said tanks, strong enough, to hold the ends of said drive bars by free pin pivot connectors;

a vertical, elliptical, air-tight hole within the middle third of each said air tanks and beside said bracket plate connector, thru which an elliptical vertical pipe is inserted and welded to the lips of said holes to prevent air leaks from said tank;

a horizontal pivot pin connector, at the bottom of said elliptical hole of each tank, to hold the bottom end of said vertical piston rod;

an x-brace, in the form of tension ropes in between said floating air tanks, to keep said air tanks stay squarely with said drive bars;

an anchor rope, tied to the bottom center of each tank and anchored to the ocean floor, to keep said tanks stay aligned;

at least three 3 pieces of weights, spacedly tied to said anchor rope some 5–30 ft from the ground anchor, to remove jerk on said anchor rope;

a set of air hose to connect said compressor to the floating said air tanks; and a main line of air hose or air pipe line, interconnecting all said air tanks, to deliver compressed air to a cental power plant.

8. A water-wave energy converter system, in accordance with claim 1, wherein, for the purpose of using said multistage piston compressor pump for the production of usable energy in the form of compressed air, electricity, or hydrogen gas fuel out of the water waves, said compressor pump is disposed to be driven/operated by the energy of the water waves thru a impact wall power transfer means and thru a floating see-saw power transfer means jointly constructed floating out on the ocean to convert the surf energy into storable compressed air, comprising:

section a: a plurality of said multistage axial-flow piston compressor pump, as in claim 1, which are disposed to be operated by said impact wall power transfer means and by said floating see-saw power transfer means;

section b: an impact wall power transfer mechanism that serves as prime driving machine that converts the energy of the water waves into a concentrated push and pull mechanical force by way of a direct smash of the water waves upon a wide face impact wall that is attached at the bottom section of a pair of rigid pendulum beams that drive the piston rod of said compressor pump, comprising:

an impact wall made of appropriate materials fastened together on a strong frame to form a wide and long rectangular flat face strong solid wall to have the capability to stop the surfs, or at which the bulky and heavy water waves or surfs will directly splash to unleash or impart their enormous energies;

at least two or a pair of structural I-Beam steel or creosoted timber beam which has a joint at its lower third that will automatically relax to let the beams bend to yeild if over loaded, with an appropriate length depending upon the characteristics of surfs in the project site, which holds together and suspends vertically the said impact wall, coupled together to act as one pendulum frame, suspended vertically by a free pivot bearing connector at its upper end with the said impact wall facing the waves at an elevation where the bottom of said wall is one foot below the lowest return cycle of the water waves;

said joint of the pendulum beam being a free pivot pintype, and being provided with a stopper compression face to make said pendulum beam to stay on a straight posture, not to bend forward, on the return cycle of the water waves;

a hydraulic jack control system, that is disposed at the said joint of each pendulum beam, that automatically relaxes to allow said beam to bend backwards to allow the over surfs to spill thru under said impact wall;

said hydraulic jack system being composed of an oil-compression chamber, a pressurized oil storage tank, a pipe for oil passage from the said compression chamber to the said pressurized storage tank, a return pipe to deliver back the oil from the said storage tank to the said compression chamber, a one-way valve that allows the oil to enter said oil-compression chamber upon the reverse stroke of the piston, a push-type valve switch that will bump against a stopper to open the said passage pipe for the compressed oil to scape and enter into the storage tank, and a structure on which the said jack system is mounted and connected to the back side of the said pedulum beam;

said pendulum beam being held and controlled at its upper tip by a free pin pivot connector to allow the impact wall to be freely playing forward and backward, but not sideward, by the action of the waves, and suspending the whole said pendulum assembly such that said impact wall be only 1/5 submerged at the lowest return cycle of the waves so that it will move forward;

a pair or two strong support posts, in the form of creosoted timber poles, or steel pipes, or plastic pipes, erected vertically at a distance between them enough to accomodate the length of the said impact wall, which supports and suspends vertically the whole said pendulum assembly in such a way that the said impact wall is vertical facing the water waves squarely;

each of said support posts being provided at the top with a horizontal arm structure thru which said pendulum assembly is suspended by the said free pin pivot connector;

said support posts being provided with bumpers that stops the pendulum frame when it swings too far back due to over sized surfs;

said support posts being further provided with bumpers that will react on the push-type valves of the said hydraulic jack control system to relax the oil pressure inside said jack in order to effect bending of said pendulum beam yielding to oversized surfs;

a coupling structure that interconnect the top of the said support posts in the form of a rigid horizontal truss that maintains a right angle with the said vertical support posts to form a large vertical rectangular-framed space thru which the said impact-wall-pendulum-beam assembly will be freely swinging back-and-forth;

a pair of guy ropes or guy wires opposedly attached to the top of said support posts and opposedly tied down to the ends of said floating pipe footings, to hold said posts rigidly erect and at right angle with said float pipes;

each said support post carry at its middle-third one said multistage compressor pump at a horizontal posture;

a horizontal drive bar connected to the rear end of the piston rod of said compressor and to the middle-third of said pendulum beams, as a means to drive said compressor;

a stilt house built on top of said support posts to serve as office and quarters for the guards and operators of the water wave energy converter;

section C: a mostly submerged floating foundation that carry, afloat on the ocean, the joint assembly of components set forth in section a and section b hereof, including other accessory components of the whole water-wave energy converter system, comprising:

at least two sets of assembled horizontal pipes, parallel to each other, laid down on water perpendicular to the waves, made of impervious materials capable of floating on water for a long time, long enough—at least with a length equal to two wave-lengths of the average large surf —to minimize oscillation of the apparatus by the water-waves, at least with a diameter of 3 inches each pipe, a point within the middle-third of one set is attached by clamp to the base of one support post of said power board system in a formation that said pipes are stacked to form a vertical single pile, likewise, the same is done with the second set of pipes upon the second said support post, the quantity and size of pipes per set depends upon the weight of load resting upon said support posts such that most of the floating pipe foundation is submerged in water in order to minimize the oscillation effects by the water waves specially during violent weather;

a vertical clip to hold together the ends of each set of stacked pipes to make it function as a rigid thin beam that can easily slice thru the in-coming water waves, the front side of which is pointed against the surfs;

a coupling set of braces at the base of said support posts and at the ends of each set of pipe foundation assembly to fix the said floating foundation to be always parallel to each other and square to the power board;

a "Y" type of anchor chain or rope, the upper two ends of which are tied to the bottom tip of each of the support posts of the impact wall power transfer means while the lower end is anchored to the sea bed the effect of which is to make the power board always face the water waves automatically by pivoting at the sea bed while on that station;

said anchor chain being provided with an appropriate weight attached to the chain at a distance of 10 meters from the ground anchor so that it will be lifted up and down when over sized waves strike the power board, in order to provide caution to and to remove jerk from the structure;

a rigid vertical bar or post to clip together the rear ends of the floating pipe foundation, which extends at least five feet above the top of said pipe foundation, which extends at least ten feet below the bottom of said pipe foundation;

an anti-oscillation resistor part 207 in the form of a rigid horizontally disposed wide-faced board below the rear end of said floating pipe foundation and attached to bottom tip of said vertical post clip, which functions to resist upward movements due to forces acting upon said post clip;

said resistor board being provided with one-way valves allowing water to pass upward thru the board in order to bring down said resistor to its correct elevation immediately before the next surf comes in, said resistor being disposed well below water surface where the water is not oscillating;

section d: a floating see-saw power transfer mechanism that converts the energy of the water waves into a concentrated push and pull mechanical force and acts as prime driving machine to operate another set of two said multistage piston compressor pump thru the oscillation of a floating barge that is carried by a couple of cylindrical floating air tanks, comprising:

at least two cylindrical air storage tanks directly floating horizontally on water, set parallel to the lines of the water waves, held together by rigid structural beams that have adjustable length to synchronize the distance between said tanks to ½ of the prevailing seasonal wave lengths of the surfs, said tanks having same length as the impact wall;

a rigid flat deck on top of said coupling structural beams to serve as work floor and anchorage of equipment;

a multistage axial-flow piston compressor, in accordance with claim 1, that is set vertically at the left and at the right front corners of said deck with the piston rods extended upward;

a drive bar disposed horizontally to have roughly fixed elevation by attaching pivotally one end to the top of said vertical clip post of the rear ends of said floating pipe foundation, and the other end attached pivotally to the middle side of said deck by means of a post that is able to lean left and right by 30 degrees, but not back and forth, which drives the said vertically disposed multistage compressor pumps by attaching the top end of the vertical piston rod to the front third point of said horizontal rigid bar;

a tie rope to serve as anchore for said storage tanks by tying each mid-point of the sides of said deck to the said rear clip post at the place of the bottom pipe member of the floating foundation, at a slack posture;

a set of flexible air pipes intercommunicating the compressors, the air tanks and the air engines;

an air driven electric generator assembled on said deck;

an electrolyzer to produce hydrogen out of electricity assembled on said deck;

a small cabin constructed on said deck to serve as shelter;

a rudder board mounted at the rear of said deck to align it with the floating pipe foundation; and an air pipeline submerged on the ocean floor to deliver compressed air into reservoirs in-land.

9. A water-wave energy converter system, in accordance with claim 8, wherein, for the same purpose of using said wide face board anti-oscillation resistor, part 107 in section c of claim 8, to stabilize a floating structure and to serve as submerged power transfer mechanism, a pluraity of said wide board resistor are spacedly attached underneath a long line of hallow floating open bottom sea wall built parallel or obligue to the lines of the water waves, to break down the surfs, and to produce compressed air, said hallow floating sea wall being subdivided by internal cross vertical walls to form adjacent compression capsuls that have at least two levels of internal horizontal subdivision walls that have large circular center holes on which a large float ball valve is sitted with a cage around it, in order to effect compression of the entrapped air by the energy of the surfs bumping against said floating wall, said wall having a plurality of in-ward one-way valves in multiple levels facing the surfs to allow fast entrance of fresh air as the water drops down from the chambers or to allow water to enter into the chambers when the surfs splash on the face of said wall.

10. An impact wall power transfer mechanism, in accordance with claim 8 or 4, wherein said mechanism is used to drive a piston water pump or to drive a straight bar-gear to effect rotation of a hoist drum.

11. A floating pipe foundation, in accordance with claim 8, wherein a plurality of sets of stacked float pipes disposed perpendicular to the water waves are used together to carry a wide flat deck afloat on the ocean for military or industrial stations, and wherein a plurality of anti-oscillation resistor board part 207 in accordance with claim 8 are spacedly attached below and along the lengths of said stacked float pipe foundations.

12. A water-wave anti-oscillation resistor board, in accordance with claim 8, wherein said resistor board part 207 is used to stabilize floating structures or equipments out on the ocean against oscillation by the water waves specially during violent weather.

* * * * *